United States Patent
Rao et al.

Patent Number: 5,613,017
Date of Patent: Mar. 18, 1997

[54] APPARATUS FOR PROCESSING IMAGE DATA AMONG MEDIA HAVING DIFFERENT IMAGE OUTPUT SIZES

[75] Inventors: Gururaj Rao; Hiroki Kanno, both of Yokohama, Japan

[73] Assignee: Kabushiki Kaisha Toshiba, Kanagawa-ken, Japan

[21] Appl. No.: 530,072

[22] Filed: Sep. 19, 1995

[30] Foreign Application Priority Data

Sep. 29, 1994 [JP] Japan .................................. 6-235391

[51] Int. Cl.$^6$ ............................. G06T 3/40; G06K 9/00; G06F 17/21
[52] U.S. Cl. .......................... 382/174; 382/177; 382/292; 382/298; 395/102; 395/110; 395/761
[58] Field of Search .................................... 382/292, 298, 382/299, 177; 358/451, 462; 395/102, 110, 148; 400/76

[56] References Cited

U.S. PATENT DOCUMENTS 3,712,443  1/1973  Mathews .
5,383,730  1/1995  Takahashi ................................. 395/102
5,425,138  6/1995  Kumakawa ............................. 395/148

*Primary Examiner*—Scott A. Rogers
*Attorney, Agent, or Firm*—Limbach & Limbach

[57] ABSTRACT

From input document data there are detected the features of the document, such as the top, bottom, left and right margins, the character space, the line space, the word space, the column space, the size and coordinates of each character, and the like. Values by which the spaces thus detected, including the character space and the line space, are to be adjusted, and a ratio at which to reduce or enlarge the characters are calculated from the features of the document and the minimum margins, the minimum character size and the like preset based on the size of the medium used in an output device such as laser printer. The coordinates of each character on the document is changed in accordance with these values and the character-reducing or -enlarging ratio. The size of the input image is changed based on the original and changed coordinates of each character. The data representing the image thus changed is supplied to the output device, which display or prints a document image, with the spaces adjusted and the characters output in an optimum size.

18 Claims, 17 Drawing Sheets

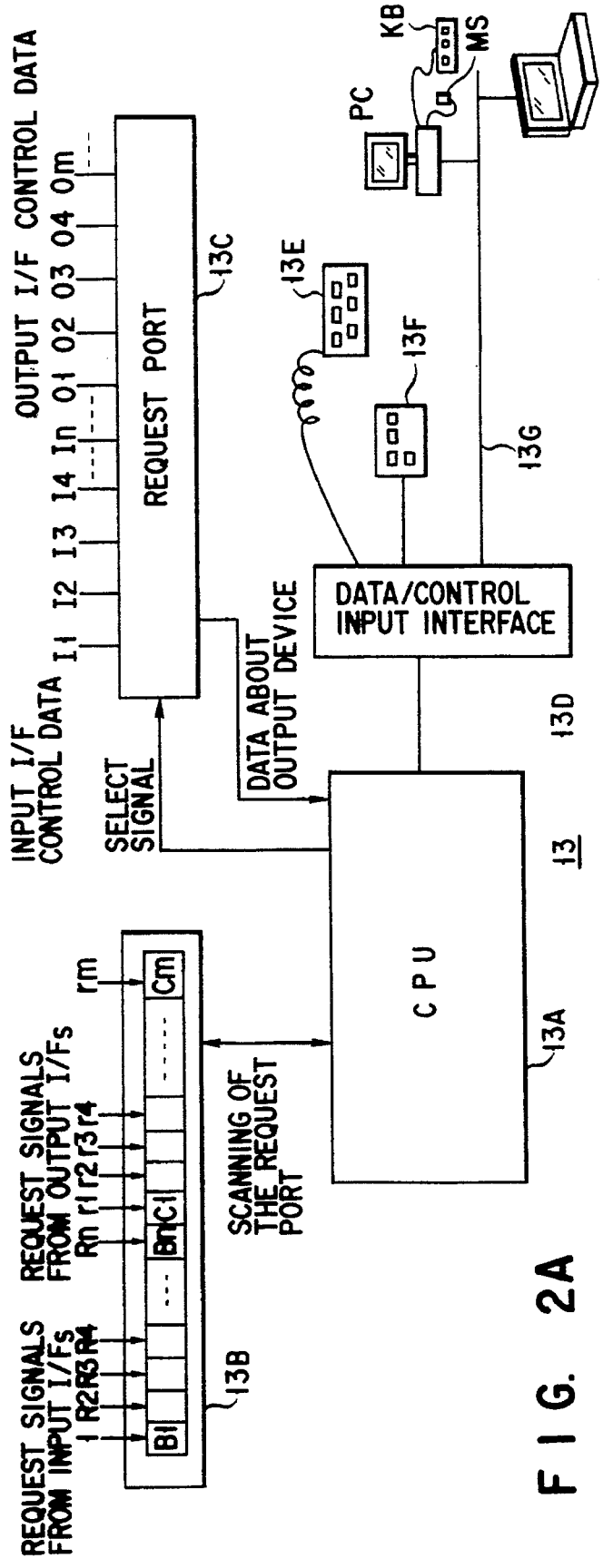
FIG. 2A
FIG. 2B
FIG. 2C

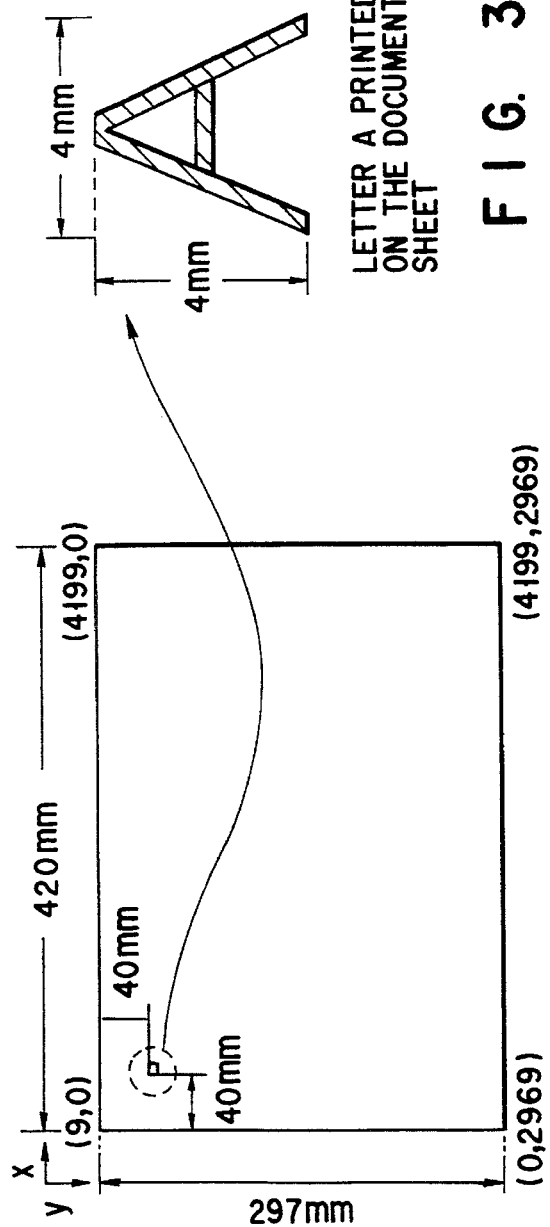
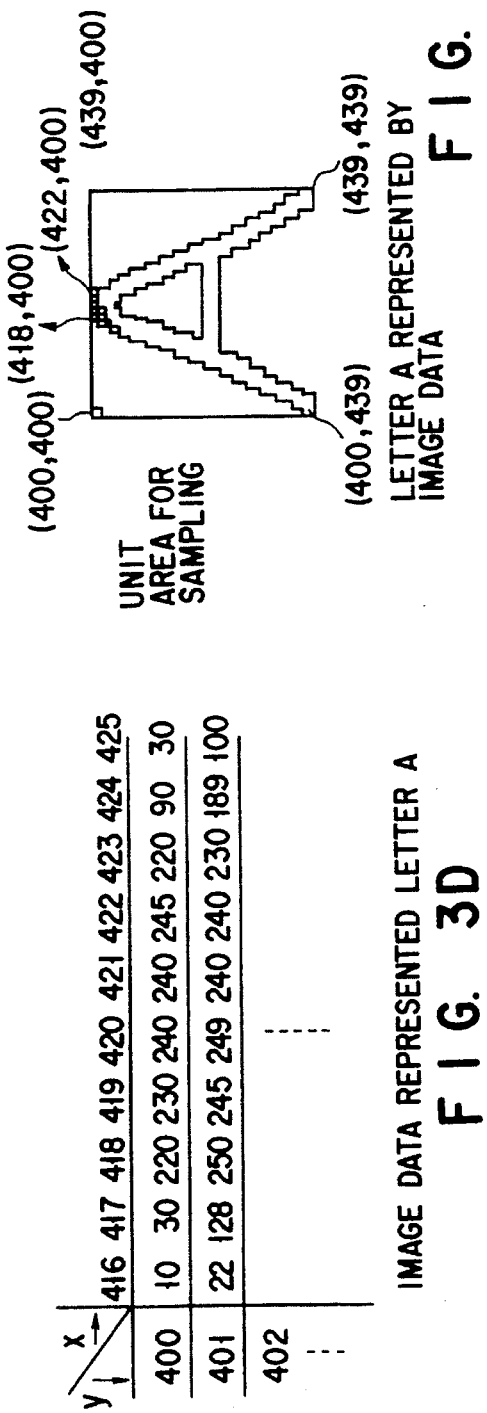

PIXEL TO PROCESS, HAVING COORDINATES (7,10) SHOW IN FIG. 6A

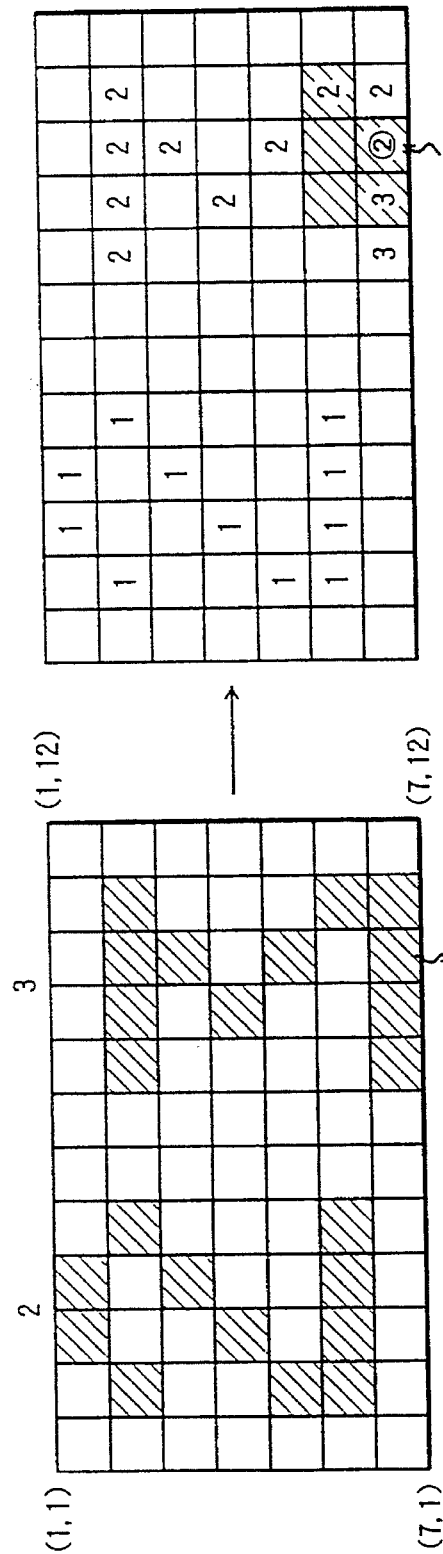
FIG. 6A
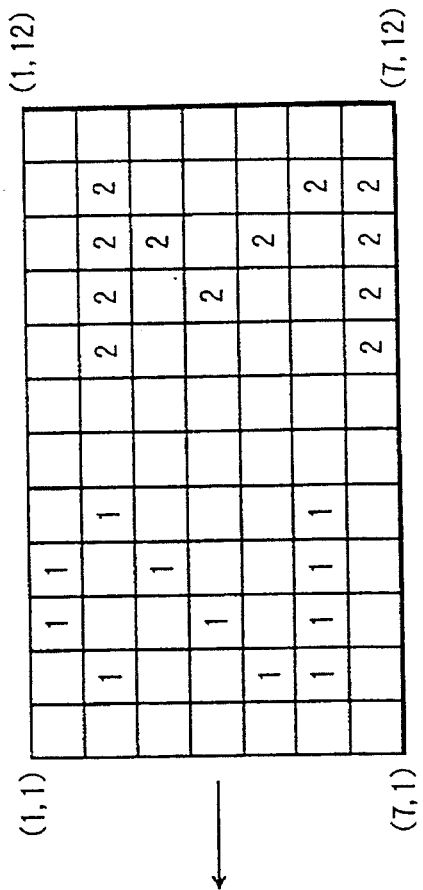
FIG. 6B
LABEL ② IS FOUND TO BE IDENTICAL TO LABEL ③ AT THIS POINT
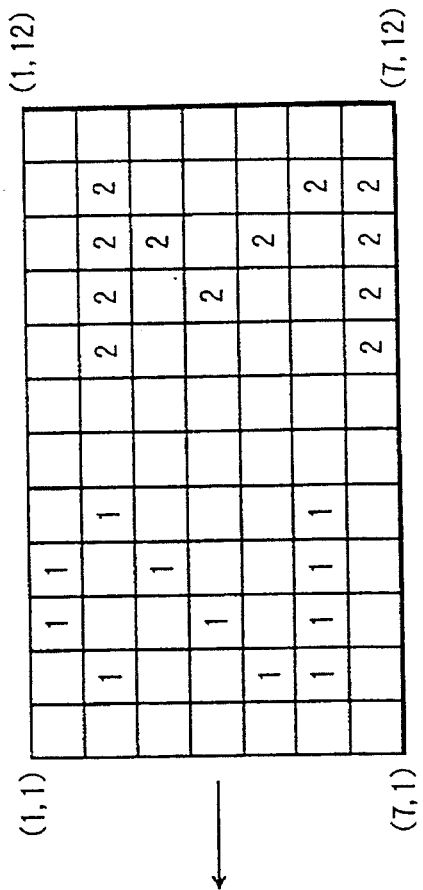
FIG. 6C
| PHYSICAL BLOCK | STARTING COORDI- NATES | | ENDING COORDI- NATES | |
|---|---|---|---|---|
| | XS | YS | XE | YE |
| 1 | 2 | 1 | 5 | 6 |
| 2 | 8 | 2 | 11 | 7 |
FIG. 6D (XL, YL) DOCUMENT SIZE
TM TOP MARGIN
BM BOTTOM MARGIN
LM LEFT MARGIN
RM RIGHT MARGIN
JP ENGLISH/JAPANESE
NL NUMBER OF LINES
NW1 NUMBER OF WORDS FORMING LINE
 NC1 NUMBER OF CHARACTERS FORMING WORD 1
  $(XS\_1\_1\_1, YS\_1\_1\_1), (XE\_1\_1\_1, YE\_1\_1\_1)$ CHARACTER 1 ⎫
  $(XS\_1\_1\_2, YS\_1\_1\_2), (XE\_1\_1\_2, YE\_1\_1\_2)$ CHARACTER 2 ⎬ COORDINATE DATA
  ... ⎭
  $(XS\_1\_1\_NC1, YS\_1\_1\_NC1), (XE\_1\_1\_NC1, YE\_1\_1\_NC1)$
 NC2 NUMBER OF CHARACTERS FORMING WORD 2
  $(XS\_1\_2\_1, YS\_1\_2\_1), (XE\_1\_2\_1, YE\_1\_2\_1)$ CHARACTER 1 ⎫ COORDINATE DATA
  ... ⎭
 $(XS\_NL\_NWL\_NCL, YS\_NL\_NWL\_NCL), (XE\_NL\_NWL\_NCL, YE\_NL\_NWL\_NCL)$
NLS NUMBER OF LARGE SPACES
 (XLS1, YLS1), (XLE1, YLE1) ⎫
 (XLS2, YLS2), (XLE2, YLE2) ⎬ COORDINATE
 ... ⎭
HLS AVERAGE LINE SPACE
HMS AVERAGE CHARACTER SPACE
(HMX1, HMY1) AVERAGE CHARACTER SIZE

FIG. 8

| | | |
|---|---|---|
| N | NUMBER OF OUTPUT DEVICES | |
| K1 | RESOLUTION OF IMAGES WHICH DEVICE 1 IS TO OUTPUT | ⎫ |
| X1, Y1 | SIZES OF MEDIA | ⎬ DATA ITEMS FOR DEVICE 1 |
| S1 | SELECT SIGNAL TO DEVICE 1 | ⎭ |
| K2 | | ⎫ |
| X2, Y2 | | ⎬ DATA ITEMS FOR DEVICE 2 |
| S2 | | ⎭ |
| ⋮ | | |
| TMM | MINIMUM TOP MARGIN | |
| BMM | MINIMUM BOTTOM MARGIN | |
| LMM | MINIMUM LEFT MARGIN | |
| RMM | MINIMUM RIGHT MARGIN | |
| CSM | MINIMUM CHARACTER SPACE | |
| LSM | MINIMUM LINE SPACE | |
| PSM | MINIMUM COLUMN SPACE | |
| SEL | SELECT SIGNAL FOR AN OUTPUT DEVICE TO BE SELECTED | |
| SAM | CHARACTERS SMALLER THAN THIS SIZE ARE ILLEGIBLE | |

FIG. 9

```
TNC (XT1, YT1), ( XT1,  YT1)        ← NUMBER OF CHARACTERS (XT2, YT2), ( XT2,  YT2)        ← START COORDINATES, HIGHT AND
                                   WIDTH OF CHARACTER 1

(XT3, YT3), ( XT3,  YT3)        ← END COORDINATES, HIGHT AND
                                   WIDTH OF CHARACTER 2
            ⋮

(XT_TNC, YT_TNC), ( XT_TNC, YT_TNC)
```

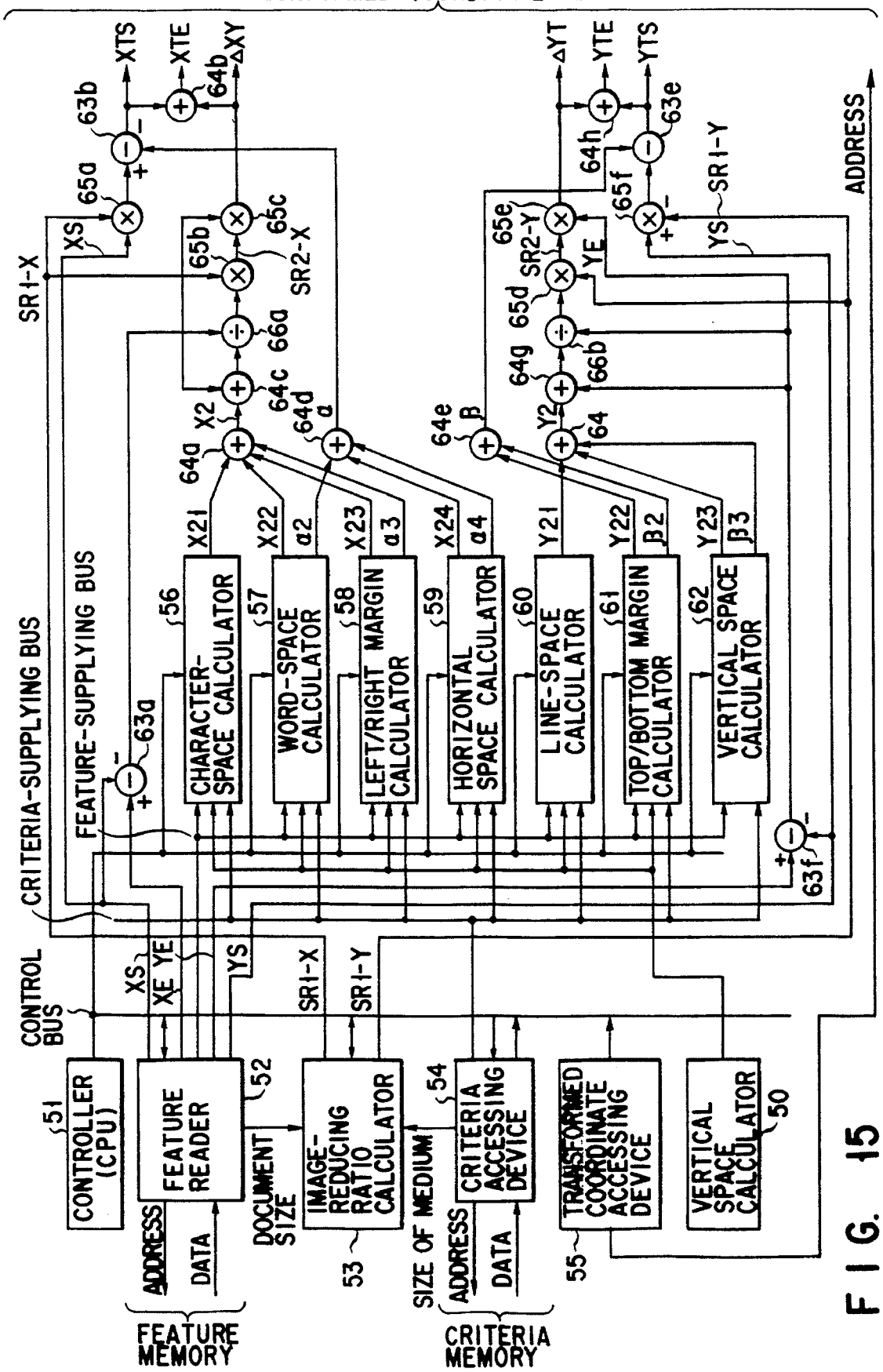
F I G. 15

SIMPLE IMAGE-REDUCING
RATION OF 50%

SPACE ADJUSTING +
IMAGE REDUCING

APPARATUS FOR PROCESSING IMAGE DATA AMONG MEDIA HAVING DIFFERENT IMAGE OUTPUT SIZES

BACKGROUND OF THE INVENTION

1. Field of the Invention

The present invention relates to an apparatus for processing image data read from a document and input from an image source such as a scanner, a facsimile device, an electronic mail device and the like, thereby to display or print dada on a medium which differs in size from the document.

2. Description of the Related Art

Image-data processing apparatuses have been put to practical use which process image data read from a document and input from an image data source such as a scanner, a facsimile device, an electronic mail transmitter and the like, thereby to display or output the image dada on a medium such as a display screen or a hard copy sheet which differs in size from the document.

An apparatus of this type receives document-image data from the image data source including image reading means such as the scanner, facsimile device and electronic mail transmitter and image transmission means, processes the received data into data which represents an image reduced in size and changed in resolution or combines document-image data items into one image data, and outputs the processed image data. The image data the apparatus has output may be supplied to a printer, which produces a hard copy of the image. Alternatively, it may be supplied to a facsimile device, which transmits the image data to a destination facsimile device.

The image data is subjected to image-reducing or image-enlarging process before it is output on a medium which differs in size from the document from which it has been read. Two problems arise, however, when the document image is reduced or enlarged in its entirety, changing characters and spaces alike in size. First, if the image is reduced, relatively small characters, if any on the document, will be output in so small a size to be illegible. Second, if the image is enlarged, relatively large spaces, if any on the document, will be output very conspicuous in comparison with the characters.

In other words, when the size of the image of the document is reduced in its entirety, there will occur a case in which the characters in the document displayed or printed become very small so that the characters cannot be recognized. Further, when the image is enlarged and displayed or printed on a medium, the spaces appear more conspicuous than the enlarged characters.

SUMMARY OF THE INVENTION

The object of the present invention is to provide an image-data processing apparatus which can process the character data and the space data included in a document such that the characters on the document may be displayed or printed in an optimum size on media different in size from the document.

According to a first aspect of the invention, there is provided an image-data processing apparatus comprising input means for inputting first document image data including area data representing an area included in a document of a first size, the area having characters and spaces located around the characters; means for converting the first document image data including area data input by the input means into a second document image data of a second size with a first conversion ratio; and size changing means for changing a relative size of the characters included in the area of the second size with respect to the spaces around the characters so that a space occupation ratio of the characters with respect to the space is increased in the area.

According to another aspect of the present invention there is provided an image-data processing apparatus comprising: input means for inputting image data representing an image including characters having a space around the characters; feature detecting means for detecting features of the image from the image data, the features including the space, character coordinates of the characters and character size of the characters; criteria memory storing predetermined criteria; coordinate calculating means for calculating a space changing ratio based on the features detected by the feature detecting means and the criteria stored in the criteria memory to obtain transformed coordinates for each of characters contained in the image; and image data conversion means for converting the space changing ratio in accordance with the transformed coordinates for each character calculated by the coordinate calculating means, the image data input by the input means and the features detected by the feature detecting means.

According to further aspect of the present invention there is provided an image processing apparatus for outputting an image having a size reduced compared to an original size, comprising: memory means for storing image data of an image including a plurality of characters and character spaces provided around the characters; means for detecting feature data including positions of the characters, sizes of the characters and spaces of the characters from the image data stored in the memory means; first calculating means for calculating a first reduction ratio (SR1) based on a size of the image data stored in the memory means and a size of an image reduced according to the first reduction ratio; means for determining whether adjustment of the spaces of the characters based on the first reduction ratio calculated by the first calculating means; and image reduction means for reducing, when it is determined by the determining means that no space adjustment of the characters is necessary, the entirety of the image stored in the memory means with the first reduction ratio based on the position of the characters and the sizes of the characters, and for reducing, when it is determined by the determining means that space adjustment of the characters is necessary, the characters included in the image stored in the memory means with a second reduction ratio smaller than the first reduction ratio (SR2:SR2>SR1) so that the spaces of the characters become more smaller than a case wherein the characters are reduced with the first reduction ratio and that the entirety of the image stored in the memory means has the same size as in a case wherein the entirety of the image is reduced with the first reduction ratio.

According to still another aspect of the present invention there is provided an image processing apparatus for outputting an image having a size reduced compared to an original size, comprising: a first memory means for storing image data of an image including a plurality of characters, character spaces provided around the characters and margin spaces around the image; means for detecting feature data including positions of the characters, sizes of the characters, spaces of the characters and the margins around the image from the image data stored in the first memory means; a second memory means for storing a minimum size of the characters, minimum size of the spaces of the characters, and minimum size of the margin spaces around the image;

a first calculating means for calculating a first reduction ratio (SR1) based on a size of the image data stored in the memory means and a size of an image reduced according to the first reduction ratio; a second calculating means for calculating a size of a character reduced with the first reduction ratio calculated by the first calculating means based on the size of the character detected by the feature detecting means; means for determining, upon comparison of the size of the reduced character with the minimum size, that no space adjustment between characters is necessary when the size of the reduced characters is larger than the minimum size, and that the space adjustment is necessary when the size of the reduced characters is smaller than the minimum size; a first image, reduction means for reducing, when it is determined by the determining means that no space adjustment of the characters is necessary, the entirety of the image stored in the memory means with the first reduction ratio based on the position of the characters and the sizes of the characters; a third calculating means for calculating adjustable values of the spaces of the characters and the margin spaces based on the spaces of the characters, margin spaces around the image, the minimum space of characters and the minimum value of the margin space around the image, when it is determined by the determining means that space adjustment of the characters is necessary; a fourth calculating means for calculating a second reduction ratio smaller than the first reduction ratio (SR2:SR2>SR1) as a character reduction ratio based on the adjustable value calculated by the third calculating means; and image reduction means for reducing, when it is determined by the determining means that the adjustment of spaces of the characters is necessary, so that the spaces of the characters and the margin spaces are smaller than a case wherein the spaces and the margin are reduced with the first reduction ratio but larger than the minimum size to make the entirety of the image stored in the, memory means have a size reduced by the first reduction ratio.

The image-data processing apparatuses according to the present invention can process the character data and the space data read from a document such that the characters on the document may be displayed or printed in an optimum size on media different in size from the document. In the case where the media is smaller than the document, the character space, the line space and the like of the document image are reduced so that the characters may be displayed or printed on the media in a relatively large size. Thus, according to the present invention, it is possible to provide, an image processing apparatus capable of utilizing a display/output media in an optimum manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the, appended claims.

BRIEF DESCRIPTION OF THE DRAWINGS

The accompanying drawings, which are incorporated in and constitute a part of the specification, illustrate presently preferred embodiments of the, invention and, together with the general description given above and the detailed description of the preferred embodiments given below, serve to explain the principles of the invention.

FIG. 2A is a block diagram of the control section of the apparatus shown in FIG. 1;

FIG. 2B is a block diagram showing a scanner for use in combination with the apparatus of FIG. 1;

FIG. 2C is a block diagram showing a display for use in combination with the apparatus of FIG. 1;

FIGS. 3A to 3D are diagrams illustrating a document-image data input to, and sampled by, the apparatus shown in FIG. 1;

FIGS. 6A to 6D are diagrams explaining the concept of image-labeling;

FIG. 8 is a diagram representing the data output from the feature detecting unit;

FIG. 9 is a diagram showing a set of criteria for selecting one or more of the output interfaces used in the apparatus shown in FIG. 1;

FIG. 15 is a block diagram showing the coordinate transformation unit of the apparatus shown in FIG. 1;

DETAILED DESCRIPTION OF THE PREFERRED EMBODIMENTS

An embodiment of the present invention will be described in detail, with reference to the accompanying drawings.

Figure 1:
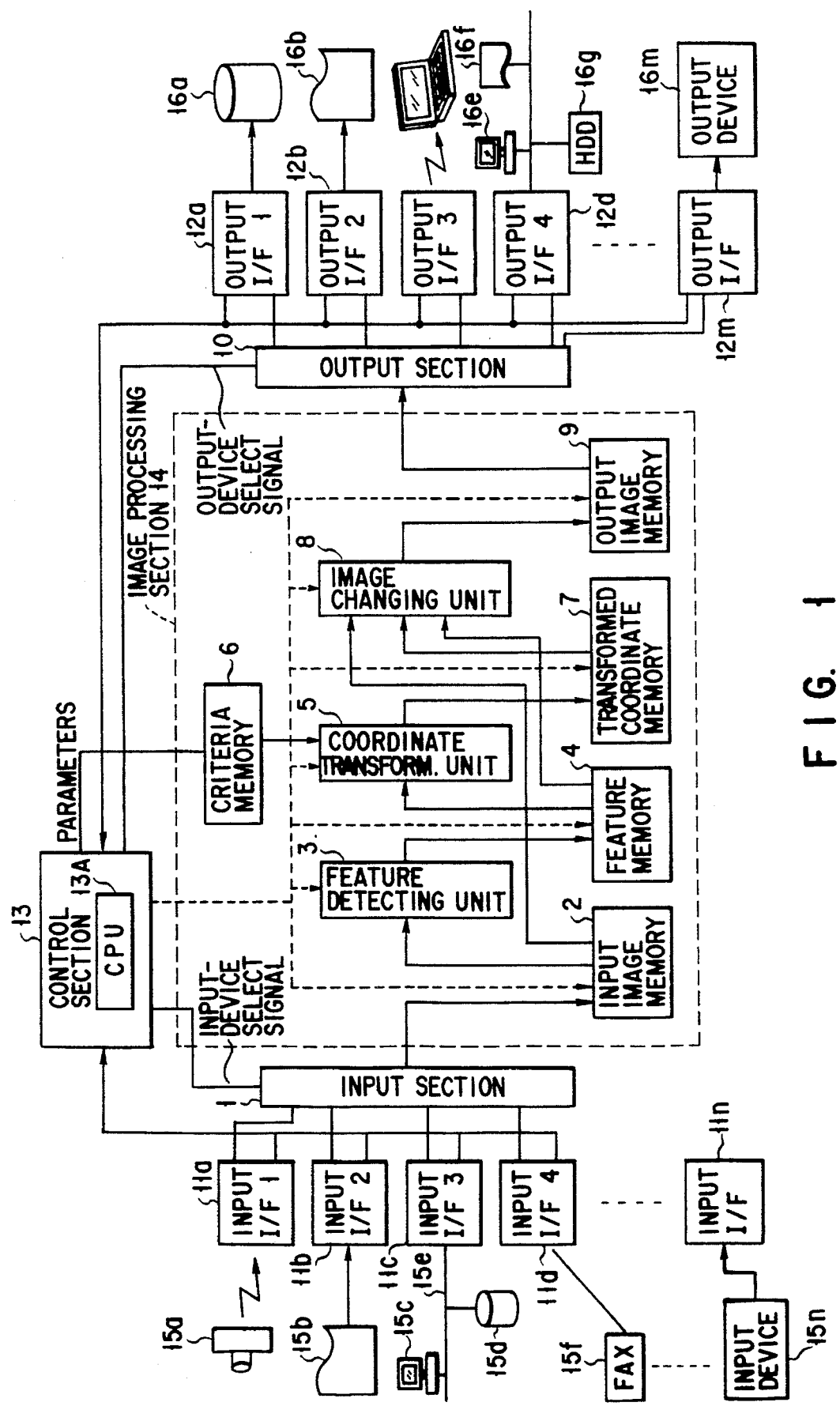
FIG. 1 is a block diagram of an image-data processing apparatus according to an embodiment of the present invention.

FIG. 1 is a block diagram of an image-data processing apparatus which is the embodiment of the invention.

As shown in FIG. 1, the image-data processing apparatus comprises an input section 1, an output section 10, a plurality of input interfaces 11a to 11n, a plurality of output interface 12a to 12m, a control section 13, an image processing section 14. The input section 1 is connected to the input interfaces 11a to 11n, which in turn are connected by cables or radio transmission to various image-data input devices. Among the image-data input devices are included an electronic camera 15a, a scanner 15b, a network 15e, a facsimile device 15f, a film reader (not shown), an electronic mail transmitter (not shown), and a server (not shown) such as a hard disk drive. The electronic camera 15a is connected to the input interface 11a by means of radio transmission. Connected by cables to the network 15e are a personal computer 15c and a memory 15d.

One of the input devices is selected by an input-device select signal supplied from the control section 13 which incorporates a CPU 13A. The image data output from the input device selected is supplied via one of the input interfaces 11a to 11n to the input section 1. For example, the image data generated by scanner 15b is input to the image processing section 14.

The image processing section 14 comprises an input image memory 2, a feature detection unit 3, a feature memory 4, a coordinate transformation unit 5, a criteria memory 6, a transformed coordinate memory 7, an image changing unit 8, and an output-image memory 9.

The input image memory 2 is provided for temporarily storing the input data representing the image on a document and supplying the data to the feature detection unit 3 and also the image changing unit 8.

From the image data read out of the input image memory 2 the feature detection unit 3 detects the physical features of the document, such as left, right, top and bottom margins, column spaces, character spaces, inter-word spaces, line spaces, coordinates of each character, size of each character, average character size, average character space, and the like. The feature detection unit 3 further determines from these features whether the characters are those of Japanese or English.

The characters used in the document include the English alphabet, the Greek alphabet, the Russian alphabet, Japanese kana characters, Chinese characters, the alphabets of some other languages, numerals, mathematical symbols, various marks in common use, and the like. All these characters shall be generally called "characters" for the sake of simplicity, in the following description of the present invention.

The feature memory 4 is provided to temporarily store the data representing the document features detected by the feature detecting unit 3 and also the data indicating whether the characters are those of Japanese or English.

The criteria memory 6 is used to store various parameters supplied from the CPU 13A incorporated in the control section 13. The parameters are criteria for selecting one or more of the output devices 16a to 16m. The parameters are: the number of output devices to be selected, the resolutions of the images to be output via the output devices, sizes of media, a minimum character size, a minimum character space, a minimum inter line space, a minimum left margin, a minimum right margin, a minimum upper margin, a minimum bottom margin, a minimum column space, and the like. The output interface 12b is connected to a laser printer 16b, and the output interface 12c to a display 16c.

The coordinate transformation unit 5 calculates an image-reducing or -enlarging ratio from the document features detected by the feature detecting unit 3 and the criteria stored in the criteria memory 6. The unit 5 also transforms the coordinates of each input character to the coordinates which the character assumes when output from the image processing section 14.

The transformed coordinate memory 7 is provided to store the data which the coordinate transformation unit 5 has generated and which represents the transformed coordinates of each character.

The image changing unit 8 extracts the image data items representing the characters from the input image data in accordance with the data items read from the input image memory 2 and showing the coordinates of the characters. The unit 8 changes, for example, the size of each character in accordance with the transformed coordinates stored in the transformed coordinate memory 7 and the image-reducing or -enlarging ratio calculated by the coordinate transformation unit 5.

The output-image memory 9 is provided to store temporarily the data generated by the image changing unit 8 and representing the image changed in size.

The output section 10 is connected to the output interfaces 12a to 12m. The output interfaces 12a to 12m are connected to the image-data output devices 16a to 16g by cables or radio transmission. More precisely, the output interface 12c is connected to the display 16c. The output section 10 selects one of the output interface 12a to 12m in accordance with an output-device select signal supplied from the control section 13. The output devices are: a memory 16a, the laser printer 16b, the display 16c, a network 16d. A personal computer 16e and a hard disk drive 16g are connected to the network 16d. If the output interface 12b is selected, the laser printer 16b will produce a hard copy of the image changed (for example, in character size) by the image changing unit 8.

The image data input to the input section 1 can be stored into the memory 16a (i.e., the main memory) via the output interface 12a, without being processed by the image processing section 14. It can also be stored into the hard disk drive 16g through the output interface 12d and the network 16d.

The control section 13 will be described in more detail. The main component of the control section 13 is the CPU 13A, which is either a commercially available one or a CPU board.

The control section 13 receives a request signal from any one of the input devices 15a to 15f through the input interface connected to the input device. Upon receipt of the request signal, the control section 13 generates an input-device select signal. The input-device select signal is supplied to the input section 1. In accordance with the input-device select signal, the input section 1 selects the input device which has generated the request signal. If the scanner 15b is selected, the image data the scanner 15b has read from a document is input to the image processing section 14. Further, the control section 13 can select one of the output devices 16a to 16g in accordance with a request signal supplied from one of the input interfaces 11a to 11n. Upon receipt of the request signal, the section 13 supplies an output-device select signal to the output section 10, which supplies processed image data to, for example, the memory 16a through the output interface 12a.

Moreover, the control section 13 can select the input devices 15a to 15n in accordance with request signals supplied from the output devices 16a to 16m through the output interfaces 12a to 12m. More specifically, upon receipt of a request signal supplied from any one of the output devices through the output interface connected to the output device, the control section 13 generates an output-device select signal and supplies it to the input section 1. The input section 1 selects the input device which has generated the request signal. Thus, any one of the input devices 15a to 15n can be selected in accordance with a request signal supplied from an output devices, and the image processing section 14 can process the data supplied from the selected input device into data of such an amount and such resolution that it may be used by the output device.

Various control devices (not shown), data input devices (not shown, e.g., a keyboard and a liquid crystal display), a remote controller, and the like are connected to the control section 13 by cables or radio transmission. When operated, any one of these devices generates a request signal, which is supplied to the control section 13. The control section generates and supplies an input-device select signal and an output-device select signal to the input device 1 and the output device 10, respectively. The input device 1 selects an input device in accordance with the input-device select signal, while the output device 10 selects an output device in accordance with the output-device select signal. As a result, the image data supplied from the selected input data can be transferred to and stored into the selected output device.

The control section 13 has an unit for detecting request signals from the input devices 15a to 15n and those from the output devices 16a to 16m. This unit will be described with reference to FIG. 2A.

As shown in FIG. 2A, the control section 13 comprises a CPU 13A, a request port 13B, a control port 13C, a data/control input interface 13D. The request port 13B has a first group of bits B1 to Bn and a second group of bits C1 to Cm. The control port 13C has terminals I1 to In and terminals O1 to Om. The terminals I1 to In are connected to the input section 1, whereas the terminals O1 to Om are connected to the output section 10.

Request signals R1 to Rn are supplied from the input interfaces 11a to 11n to the bits of the first group. Request signals r1 to rm are supplied from the output devices 16a to 16m to the bits of the second group. Each bit of either group is set at the value of "1" when it receives a request signal. The CPU 13A scans the bits of both group, one after another. Upon detecting that any of these bits is set at "1," the CPU 13A determines that a request signal has been supplied from the corresponding input or output device via the corresponding input or output interface. The CPU 13A then generates and supplies a device select signal SEL to the control port 13C. In response to the device select signal the control port 13C connects the control bus of the input or output device to the image processing section 14, and receives data from the input or output device. Based on the data it receives, the control port 13C then selects the input or output device.

The image data on a blackboard which the electronic camera 15a has read, for example, is supplied to the input interface 11a by radio transmission and further to the image processing section 14 through the input section 1. Alternatively, the image data on an electronic blackboard which the scanner 15b has read may be supplied to the input interface 11b by the cable and further to the image processing section 14 through the input section 1. The image processing section 14 transfers the image data to the output section 10, without processing the image data, or processes the image data having the sizes of the characters and the character space, line space, column space being changed. The image data not processed or processed by the image processing section 14 is supplied from the output section 10 to, for example, a server (not shown) used as an output device through the corresponding output interface, or to the facsimile device 16f through the output interface 12 and the network 16d.

When the CPU 13A determines that a request signal has been supplied from an output device to the corresponding output interface, it generates and supplies a device select signal to the control port 13C. The control port 13C connects the control bus of the output device to the image processing section 14, and receives data from the input or output device. Based on the data it receives, the control port 13C then selects the output device.

Suppose that a person makes an access to the image processing section 14 via the output interface 12c from a place outside his office, by radio transmission by means of a PDA (personal data assistance). He or she then causes the section 14 to perform processing on the necessary image data stored in the server, such as the adjusting of the character space, line space, column space. The image data thus processed is output from the output interface 12c to the PDA by radio transmission. The display 16c connected to the PDA displays the image represented by the processed image data.

As shown in FIG. 2A, a keyboard 13E, a touch panel 13F and a network 13G are connected to the data/control input interface 13D. A desktop personal computer PC, a laptop personal computer LAPTOP and the like are connected to the network 13G. A keyboard KB and a mouse MS are connected to the desktop personal computer PC. The devices connected to the network 13, G are used as means for inputting, outputting and storing image data. Thus, the image data generated by, for example, a remote camera controlled by the remote controller can be processed into image data representing an image of such a size and such a resolution as to be printed by a remote printer.

In the control section 13 shown in FIG. 2A, the request port 13B and the control port 13C cooperate to respond to the request signals supplied from the input interfaces 11a to 11n and the request signals supplied from the output interfaces 12a to 12m. Further, the section 13 may be operated by a more versatile and more advanced control method based on technical concept such as bus arbitration and queuing which are widely employed in the existing computer systems.

The components shown in FIG. 1 will be described in greater detail.

The input section 1 is provided to select one of the input devices 15a to 15n which is designated by a input-device select signal supplied from the control section 13 and to connect the input device selected to the image processing section 14. Assume that the section 1 selects the scanner 15b and that the scanner 15B is an 8-bit scanner which reads an image at resolution of 10 pixels per millimeter. Then, the document image data sampled at pitch of 0.1 mm (i.e., 10 pixels/mm) is supplied from the scanner 25b to the image processing section 14.

FIG. 3A to 3D illustrate an document and the image data obtained by scanning the document. The document is a printed sheet of A3-size (420×297 mm), and the image data has been obtained by scanning the document at sampling pitch of 0.1 mm. The image data represents 4199×2969 pixels as can be understood from. FIG. 3A. Each pixel can be displayed at 256 gray-levels. Hence, the image data is composed of about 12 megabytes.

Assume that a letter A having a size of 4×4 mm as shown in FIG. 3B is printed at a distance of 40 mm measured in X-axis (horizontal) direction and at a distance of 40 mm measured in Y-axis (vertical) direction from the upper-left corner of the document as shown in FIG. 3A. In this case, the start coordinates for the letter A are (400, 400), and the end coordinates therefor are (439,439), as can be seen from FIG. 3C.

The document is scanned in units of sampling areas S illustrated in FIG. 3C. The sampling areas correspond to pixels. For example, the sampling area S located at distance of 41.8 mm and 40 mm, respectively measured in the vertical and horizontal directions, from the upper-left corner of the document, assumes a position identified by coordinates (418, 400) and has a value of 220 as shown in FIG. 3D. The value for each pixel is stored in the input image memory 2, at the address which corresponds to the coordinates representing the position of the pixel. The value of the pixel indicates the density of the pixel. The greater the value, the higher the gray level of the pixel.

The image data is read from the input image memory 2 to detect, from the image data, the physical features of the document, i.e., the left, right, top and bottom margins, the coordinates of relatively large spaces and the sizes thereof, the number of lines written in English and Japanese, the number of words forming each line, the number of characters forming each word, the coordinates of each character, the size of each character, the average character space, and the like. The data representing these document features is stored into the feature memory 4.

Figure 4:
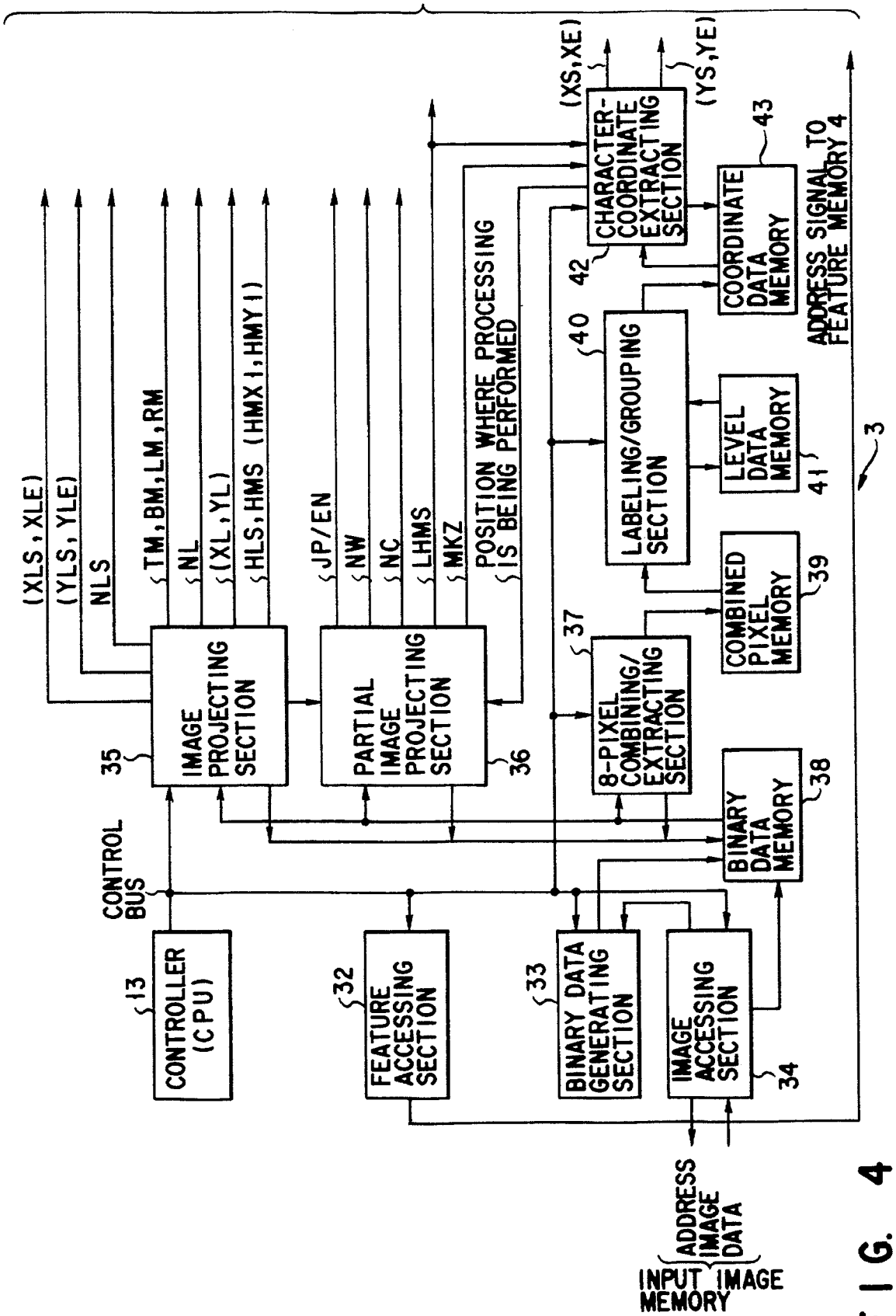
FIG. 4 is a block diagram showing the feature detecting unit of the apparatus.

As shown in FIG. 4, the feature detecting unit 3 is connected to the control section 13 and operates under the control of the control section 13. The unit 3 comprises a feature accessing section 32, a binary data generating section 33, an image accessing section 34, an image projecting section 35, a partial image projecting section 36, an 8-pixel combining/extracting section 37, a binary data memory 38, a combined pixel memory 39, a labeling/grouping section 40, a label data memory 41, a character-coordinate extracting section 42, and a coordinate data memory 43.

The feature accessing section 32 is designed to generate addresses, control signals, and the like which are used to store the document features into the feature memory 4. Like the section 32, the image accessing section 34 is designed to receive data from the input image memory section 2 and supply data to the input image memory 2.

The binary data generating section 33 is provided to receive the image data the image accessing section 34 has read from the input image memory 2 and to convert the image data into binary data. To be more specific, the binary data generating section 33 compares each input pixel value with a preset threshold value. If the input pixel value is greater than the threshold value, the section 33 outputs a "1" bit, which represents a black dot. Otherwise, the binary data generating section 33 outputs a "0" bit, which represents a while dot. The binary data memory 38 is provided to store the binary image data thus generated by the section 33.

Figures 5, 7A, 7B:
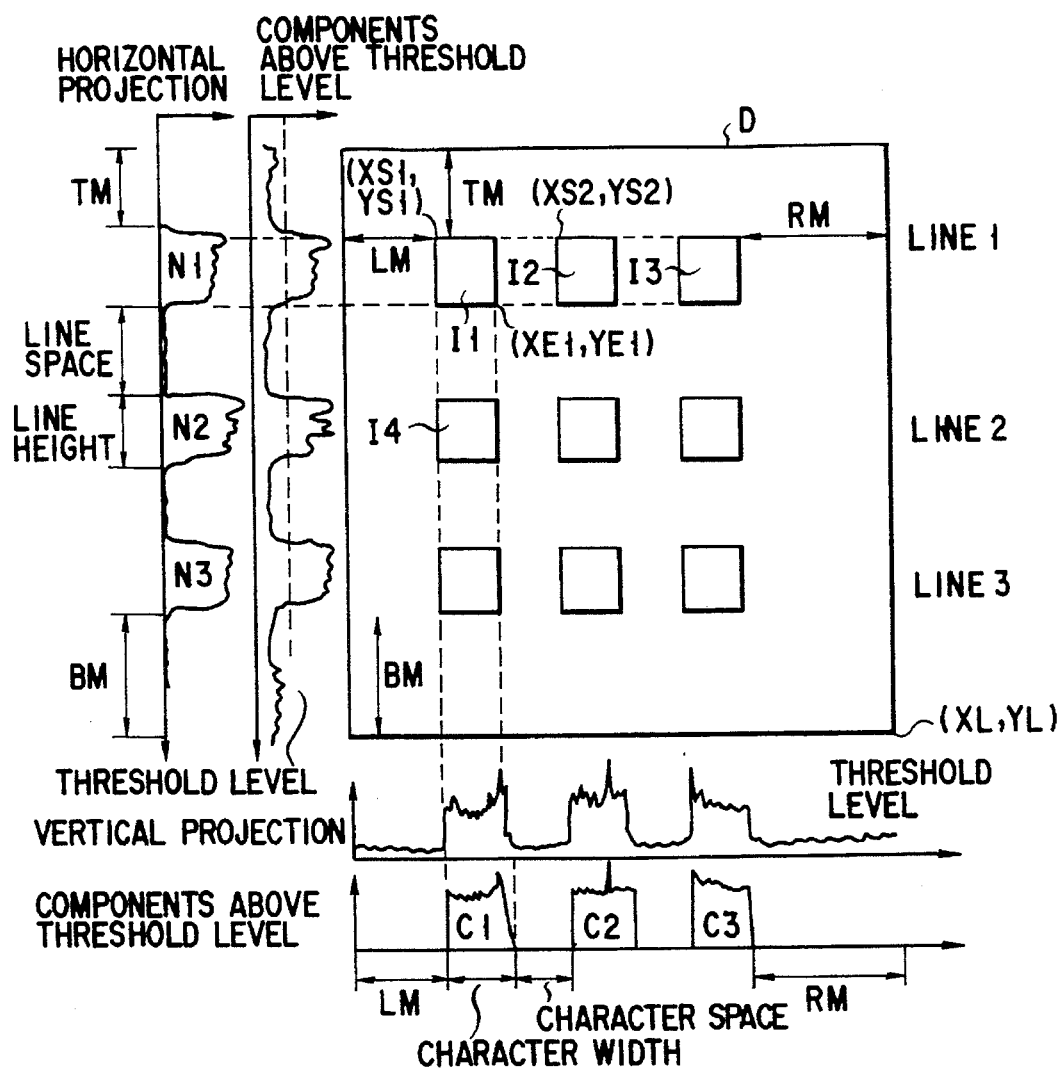
FIG. 5 is a diagram explaining how the image data on a document is projected.
FIG. 7A shows a set of adjacent pixels which are to be extracted and combined.
FIG. 7B shows another set of adjacent pixels which are to be extracted and combined.

The image projecting section 35 is designed to project the image on the entire document, in both the vertical direction and the horizontal direction. In other words, the section 35 compares each the value of each pixel with a preset threshold value and detects black pixels from each line and black pixels from each column. The number of black pixels detected from the line is the projection value for the line, while the number of black pixels detected from the column is the projection value for the column. number each column. FIG. 5 explains how the image projecting section 35 performs its function. The threshold value is, for example, half the number of all black pixels the section 35 has detected. Thus, the image projecting section 35 detects various spaces on the document and determines the sizes thereof.

Shown in FIG. 5 are squares I1, I2, I3, I4, . . . which represent characters printed on the document. The space between the squares I1 and I2 is a character space. The space between the squares I1 and I4 is a line space. If the start coordinates (XS1, YS1) of the square I1 are identical those of the letter A shown in FIG. 3A, then (XS1, YS1) = (400, 400). Assuming that the square I1 is has the same size of the letter A shown in FIG. 3B, the end coordinates (XE1, YE1) of the square I1 are (440, 440). Assume that the space between the squares (characters) I1 and I2, i.e., the character space, is 2 mm and that the space between the squares (characters) I1 and I4, i.e., the line space, is 6 mm. In this case, the start coordinates (XS2, YS2) of the square I2 are (460, 400), and the end coordinates (XE2, YE2) thereof are (500, 440).

Further assume that the start coordinates (XS4, YS4) of the square I4 are (400, 500), and the end coordinates (XE4, YE4) thereof are (440, 540). In this case, the output signal the image projecting section 35 generates when it projects the document image in the horizontal direction rises to a high level at the upper edge of the character line which is located about 400 pixels (i.e., the top margin TM) below the upper edge of the document. The output signal of the section 35 remains at that high level for about 40 pixels. Thus, the top margin TM and the first character line 1 are detected. As the image projecting section 35 further projects the document image in the horizontal direction, it generates an output signal which rises to a high level at the upper edge of the character line, which is located about 500 pixels (i.e., the top margin TM) below the upper edge of the document. This output signal of the section 35 remains at that high level for about 40 pixels, too. Thus, the second character line 2 is detected.

As the image projecting section 35 projects the document image in the vertical direction, it generates an output signal which rises to a high level at the left margin LM which is located 400 pixels from the left edge of the document. The character space is detected from the distance between the trailing edge of the signal and the next leading edge thereof (i.e., XS2–XE1=20 pixels), and the character size is detected from the portion for which the signal remains at the high level (i.e., XE1–XS1=40 pixels). The image projecting section 35 calculates the margin RM from the distance between the last trailing edge of the signal and the right edge of the document.

If two different character spaces are detected, one being about 1.5 to 2 times the other, the greater character space is regarded as an inter-word space. If two different line spaces are detected, one being, for example, about 3 times the other, the greater line space is regarded as a column space. The image projecting section 35 detects the number of character lines which the document has, from the number of peaks (N1, N2, N3, . . . ) of the output signal which the section 35 generates while projecting the document image in the horizontal direction. The partial projecting section 36 detects the number of characters forming a line from the number of peaks (C1, C2, C3) of the output signal which the section 36 generates while projecting the document in the vertical direction. Also the section 36 calculates the average character size (LHMS), the number of words (NW), and the number of characters (NC).

Furthermore, the image projecting section 35 calculates the height-to-width ratio of each character. If most characters have a height-to-width ratio of nearly 1, the section 35 determines that the document is written in Japanese, and outputs a label "JP." If most characters have a height-to-width ratio of nearly 2 and if there are two different character spaces (i.e., the character space and the word space), the section 35 determines that the document is written in English, and outputs a label "EN." The coordinates (XLS, YLS) of a column space (i.e., a relatively large space) also the number of line spaces (NLS) are stored into the binary data memory 38.

The partial image projecting section 36 receives various data items from the image projecting section 35, including the positions of character lines and the character spaces. The section 36 reads the data representing the character lines from the binary data memory 38. Then, the section 36 projects each character line in the vertical direction, thereby calculating the number of words (NW) forming the line, the number of characters (NC) forming the line, the start coordinates (MKZ) of each character, the average character size (LHMS), and the like.

The 8-pixel combining/extracting section 37 for extracting connection component data of the combined 8 pixels, the labeling/grouping section 40, and the character-coordinate extracting section 42 are provided to calculate the coordinates of each character as will be explained with reference to FIGS. 6A to 6D.

FIG. 6A shows numerals "2" and "3," either represented by an arrangement of black pixels. FIG. 6B illustrates the binary data generated by the 8-pixel combining/extracting section 37. FIG. 6C explains how the labeling/grouping section 40 processes the binary data supplied from the section 37 by means of the equivalence and group-combining process. FIG. 6D shows the start coordinates and the end coordinates for the block formed of the eight pixels extracted and combined by the 8-pixel combining/extracting section 37.

It will be explained how the 8-pixel combining/extracting section 37 extracts the connecting component of the adjacent eight pixels with respect to an interest pixel. Adjacent pixels used to obtain a connecting component of an interest pixel P are shown in FIGS. 7A and 7B. FIGS. 7A and 7B show five adjacent pixels from which the connecting component is to be extracted. To find the connecting component with respect to the interest pixel P, the 8-pixel combining/extracting section 37 carries out the following sequence of steps:

Step 1: To put label "0" to the interest pixel P if the value of the pixel P is 0.

Step 2: To put a new label to the pixel P if the value of the pixel P is 1 and if the adjacent pixels A, B, C and D in FIG. 7A have labels of "0."

Step 3: If at least one of the pixels A, B, C and D has a label other than "0," select the one label other than "0" (e.g., the smallest label) and put it to the pixel P. Then the data indicating that the labels other than "0" are equivalent is recorded.

In step 3, if the case where the interest pixel P to be processed has coordinates (7, 10) as shown in FIG. 6A, the adjacent pixels A, B and C shown in FIG. 7A have already been processed and have the labels specified in FIG. 7B. The five pixels shown in FIG. 7B are identical to those five pixels hatched in FIG. 6B. As shown in FIG. 6B, the interest pixel corresponding to the pixel P of FIGS. 7A and 7B has a binary value of "1" and the least label of the adjacent pixels having other than "0" is "2." Thus, label "2" is put to the pixel to be processed. Since some of the adjacent pixels has label "3," as shown in FIG. 6B, it is recorded in the memory 39 that labels "2" and "3" are equivalent.

The label data representing the labels of pixels and the equivalent label data are equivalent are stored into the combined pixel memory 39.

The labeling/grouping section 40 reads the label data and the equivalent label data from the combined pixel memory 39. It forms groups of labels, each group consisting of the identical labels, by replacing some labels with new label as illustrated in FIG. 6C. The label group data representing the label groups thus formed is stored into the labeling data memory 41. The labeling/grouping section 40 performs re-labeling on the pixels having equivalent labels by using the new label. Thereafter, the section 40 scans the label data memory 41 and reads the greatest coordinates and the least coordinates which have the same label. The pixels having the same label are considered to form a single physical block. Hence, the least coordinates is the start coordinates of the physical block of pixels, whereas the greatest coordinates is the end coordinates thereof. The data representing the least coordinates and the greatest coordinates are stored into the coordinate data memory 43.

The character-coordinate extracting section 42 receives the data showing the average character size LHMS and the start coordinates MKZ of each character from the partial image projecting section 36. Using the average character size LHMS and the start coordinates MKZ, the section 42 combines physical blocks of pixels, thereby calculating the coordinates of one character. In other words, the physical blocks existing in a column which has the average character size and whose start coordinates are identical to those of a character are combined to define a character. Of the coordinate data items for the physical blocks combined, the least coordinate data item and the greatest coordinate data item represent the start coordinates of the character and the end coordinates thereof, respectively.

Assume that two blocks, each having the start and end coordinates specified below, are combined to define a character.

Block 1 (xs1, ys1), (xe1, ye1)

Block 2 (xs2, ys2), (xe2, ye2)

The combined block formed of these blocks has the start and end coordinates (xs, ys) and (xe, ye), the width Δx and the height Δy, which are as follows: xs=min (xs1, xs2)

$$ys = \min (ys1, ys2) \qquad (1)$$
$$xe = \max (xe1, xe2)$$
$$ye = \max (ye1, ye2)$$
$$\Delta x = xe - xs$$
$$\Delta y = ye - ys$$

The feature detecting unit 3 performs the above-described process on every character of any character line printed on the document D, thereby calculating the coordinates of the respective characters as well as the width Δx of each character and the height Δy thereof. The document features obtained by the method described above are written under the control of the CPU 13A into those addresses of the feature memory 4 which are designated by the feature memory accessing section 32. On the other hand, the document features detected by the section 3 are stored into the feature memory 4 in such a manner as is illustrated in FIG. 8.

The coordinate transformation unit 5 calculates an image-reducing or -enlarging ratio, the space changing ratio and the like from the document features detected by the feature detecting unit 3 and the criteria stored in the criteria memory 6. The unit 5 also transforms the coordinates of each input character to the coordinates which the character will assume when it is output from the image processing section 14. The coordinate of the character, thus transformed, is stored into the transformed coordinate memory 7.

The coordinate transformation unit 5 will be described in detail, with reference to FIG. 9, FIGS. 11A to 11C, FIG. 12, FIG. 13 and FIGS. 14A to 14C.

Data items generated by operating the keyboard 13E of FIG. 2A and representing the number N of the output devises such as the laser printer 16b and the display 16c, the sizes X1, Y1 of the objective media such as the paper sheets for hard copies and the resolution of the input/output devices (K1) can be preset in the criteria memory 6 through the CPU 13A or through the output interfaces O1 to Om. Also, data items representing top margin minimum TMM, bottom margin minimum BMM, left margin minimum LMM, right margin minimum RMM, and the like as shown in the following table can be preset in the criteria memory 6 through the CPU 13A. Some of the data items the CPU 13A can supply to the criteria memory 6 are also shown in FIG. 9.

- TMM Top Margin Minimum
- BMM Bottom Margin Minimum
- LMM Left Margin Minimum
- RMM Right Margin Minimum
- CSM Character Space Minimum
- LSM Line Space Minimum
- PSM Column Space Minimum
- SAM Space Adjust Minimum The operation of the coordinate transformation unit 5 will be explained, with reference to the flow chart of FIG. 10.

The coordinate transformation unit 5 has three major functions to perform, (i) to determine whether or not space adjustment is required before outputting document image data, (ii) to adjust spaces, if necessary, and calculate an image-reducing or -enlarging ratio, and (iii) to change the coordinates of each input character to new coordinates.

To determine whether or not space adjustment is required before outputting document image data, the coordinate transformation unit 5 reads the minimum character space, the minimum line space, the minimum word space and the minimum column space from the criteria memory 6, and reads the coordinates of each character from the feature memory 4. From the data items it has read, the unit 5 calculates the size of each character. The coordinate transformation unit 5 multiplies the character size by the image-reducing ratio, obtaining a reduced size of the character (ST1). For example, character 1 of word 1 of line 1 has a width X_SIZE given below:

$$X\_SIZE = XE\_1\_1\_1 - XS\_1\_1\_1 \qquad (2)$$

The width X_SIZE is multiplied by the image-reducing ratio SR (e.g., 0.71 in order to reduce an A3-size image to an A4-size image). The reduced width of character 1, XO_SIZE, is therefore:

$$XO\_SIZE = X\_SIZE * SR \qquad (3)$$

If the reduced width X0_SIZE is less than the minimum character width stored in the criteria memory 6, the character space must be changed to adjust the image-reducing ratio (ST2).

In the case where various spaces need to be adjusted, parameters required to adjust the spaces and an image (character)-reducing ratio are calculated (ST3). If the spaces need not be adjusted, the coordinate transforming unit 5 transforms the position data in accordance with the image-reducing ratio obtained in step ST1. It may become necessary to adjust the spaces after the image-position data has been transformed. In this case, the unit 5 transforms the position data in accordance with the parameters calculated in step ST3 and the image-reducing ratio also calculated in step ST4. The position data thus transformed is stored into the transformed coordinate memory 7 (ST5).

As can be understood from the character-width reducing process exemplified above, various spaces need to be adjusted in order to change the size of the image in the document. Some representative examples of space adjustment will be explained below.

A. Adjustment of Character Space and Line Space

Figure 11B:
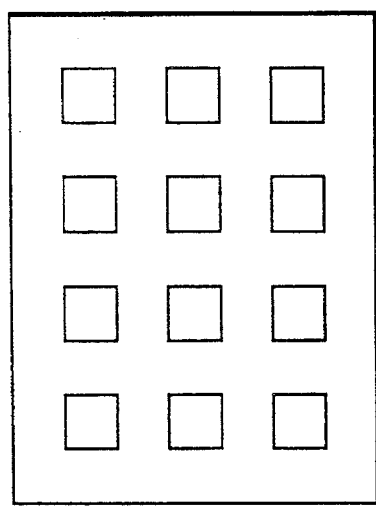
FIGS. 11A, 11B and 11C are diagrams explaining the concept of space-adjusting performed on the image data input to the apparatus.
Figure 11C:
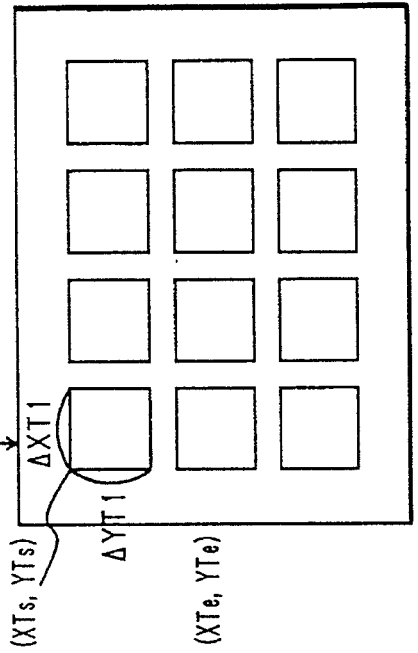
Figure 11A:
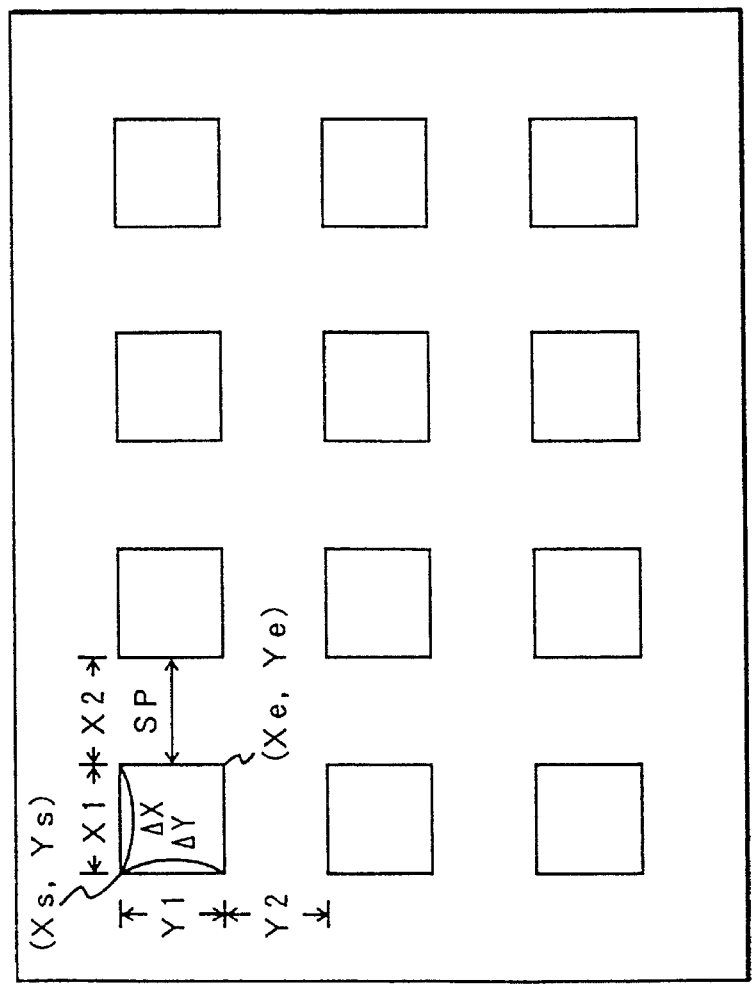

FIGS. 11A, 11B and 11C are diagrams explaining the concept of the space-adjusting. When the entirety of the input document image D shown in FIG. 11A is reduced in width and height by 50%, the resultant reduced image can be output on a medium whose area is 25% of the document D (i.e., the original medium) as shown in FIG. 11B. The characters in the reduced medium of FIG. 11B can be displayed or printed in a comparatively large size by reducing the character space, as is illustrated in FIG. 11C.

The minimum space SP on the original document D is:

$$SP = \min(X2, Y2) \qquad (4)$$

where X2 is the character space and Y2 is the line space. The character space LSM' on the document D is expressed as:

$$LSM' = LSM/SR1 \qquad (5)$$

where LSM is the minimum character space in the reduced document of FIG. 11B preset by the CPU 13A and the SR1 is a simple image-reducing ratio. The value X2' of a space which can be used to adjust the size of the characters is:

$$X2' = |SP - LSM'| \qquad (6)$$

Hence, the image-reducing ratio SR2 for the width X1 of the characters on the document D can be obtained as follows:

$$X1 * SR2 = (X1 + X2') * SR1 \qquad (7)$$
$$SR2 = (1 + X2'/X1) * SR1$$

Figures 10, 13:
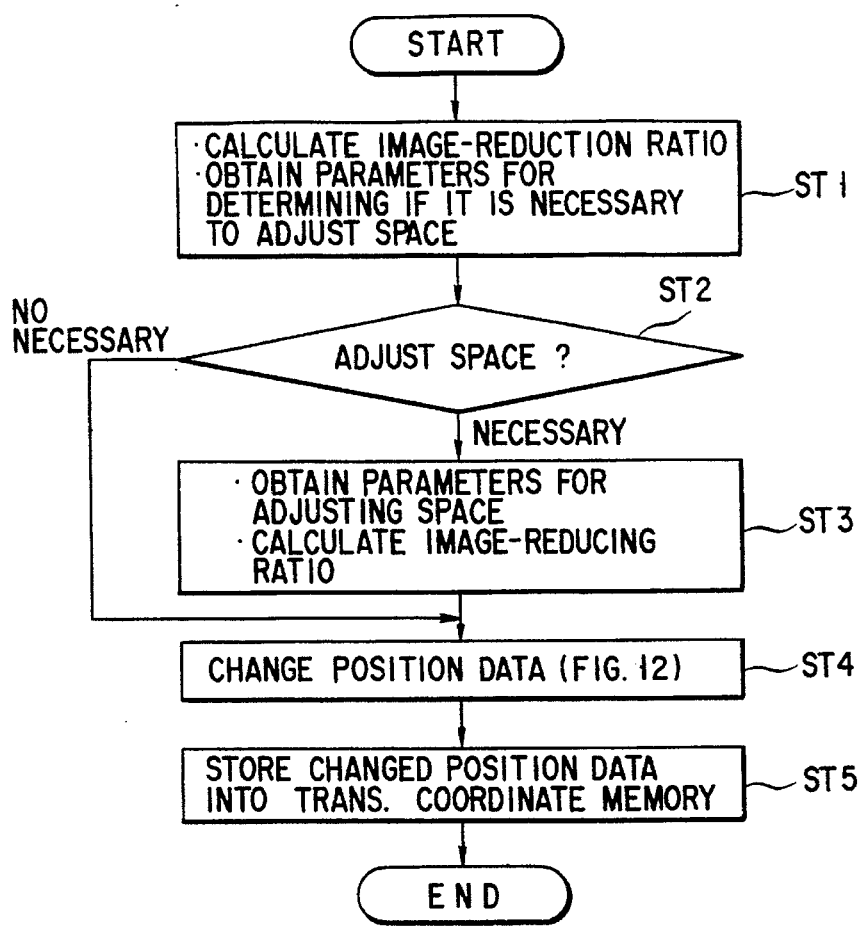
FIG. 10 is a flow chart explaining the data-processing of the coordinate transforming unit of the apparatus shown in FIG. 1.
FIG. 13 is a diagram illustrating an example of output data of the coordinate transformation unit.
Figure 12:
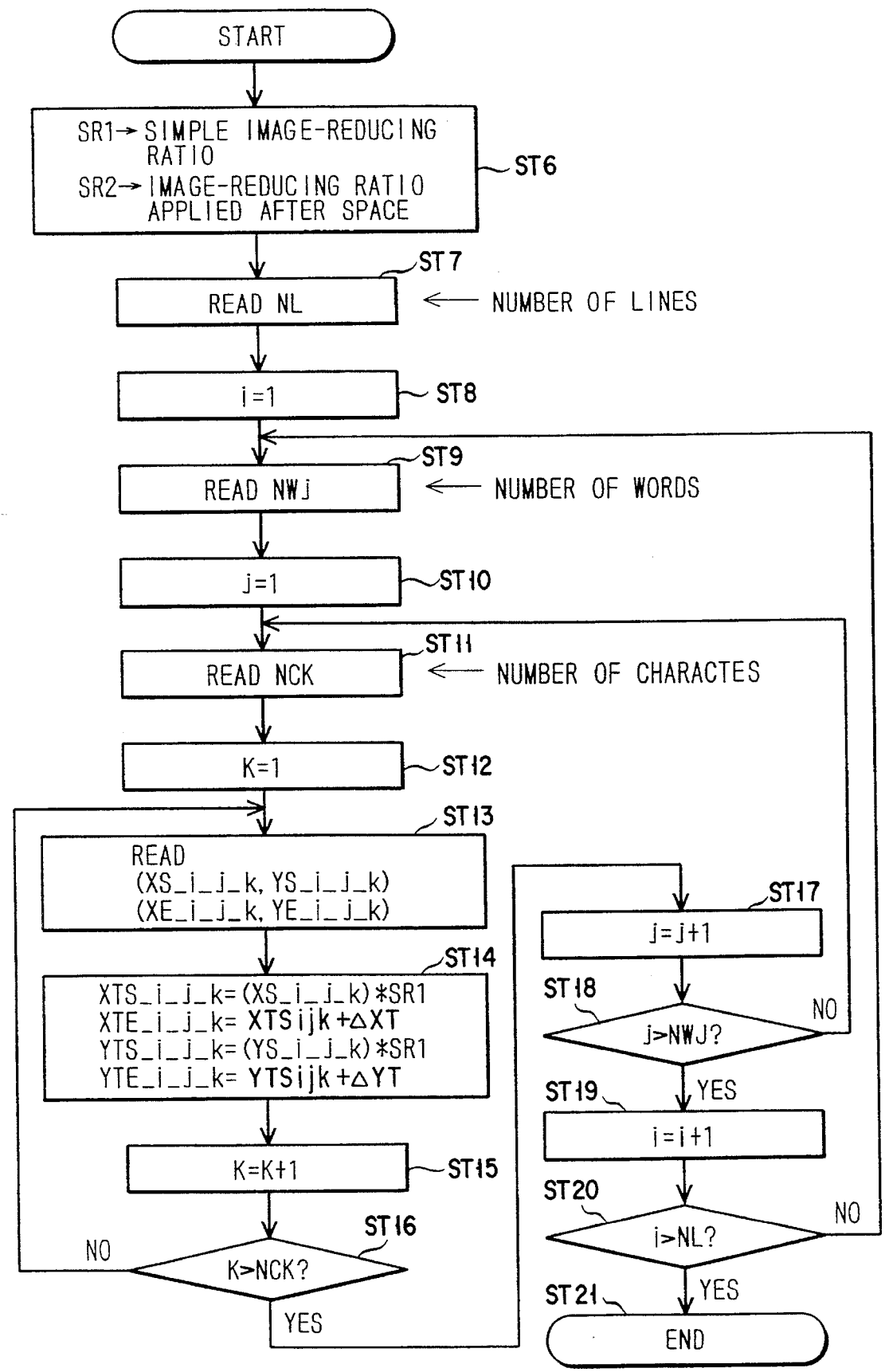
FIG. 12 is a flow chart explaining the process of changing position data.

FIG. 12 is a flow chart explaining the process of the space adjustment or the changing position data, which is one of the steps shown in the flow chart of FIG. 10. First, in FIG. 12, a simple image-reducing ratio SR1 is calculated from the input/output media data and the like, and an image-reducing ratio SR2 to be applied after the spaces is calculated from equations (4) to (7) (ST6). Then, the number of lines NL is read from the feature detecting section 3 (ST7). The number of characters and words forming each character line, (Nwj), is also read from the feature detecting section 3 (ST9). The number of characters forming each word, NCk, is read from the feature detecting section 3 (ST11). Further, the start and end coordinates of each character represented as (XS_i_j_k, YS_i_j_k), (XE_i_j_k, YE_i_j_k) in FIG. 12 are read from the feature detecting section 3 (ST13). Next, the start-point coordinates (STS-i_j_k, YTS_i_j_k) and end-point coordinates (XE_i_j_k, YE_i_j_k) of each character, which are to be applied after the spaces are adjusted, are calculated from the image-reducing ratios SR1 and SR2 in accordance with Equation (8) (ST14). In Equation (8), the start-point coordinates and the end-point coordinates are represented as (XT_start, YT_start) and (XT_end, YT_end), respectively. Here, "i_j_k" means the kth character in the jth word of the ith line. In this process, the start and end coordinates of each character are first calculated. The width X1 of the character not changed yet in size is:

$$X1 = X\_end - X\_start$$

Thus, the start coordinates XT_start which the character assumes after the character space is adjusted is defined as:

$$XT\_start = X\_start * SR1$$

The changed character width ΔXT is given as follows:

$$\Delta XT = X1 * SR2$$

Therefore, the end coordinates XT_end which the character assumes after the character space is adjusted is:

$$XT\_end = XT\_start + \Delta XT$$

Similarly, the height Y1 which the character has before its size is changed is defined as:

$$Y1 = Y\_end - Y\_start \qquad (8)$$

It follows that the start coordinates which the character assumes after the character space is changed is given as:

$$YT\_start = Y\_start * SR1$$

The height $\Delta YT$ is:

$$\Delta YT = Y1 * SR2$$

Hence, the end coordinates the character takes after the character space is changed is defined as follows:

$$YT\_end = YT\_start + \Delta YT$$

The data items, thus generated by the coordinate transformation unit 5, are stored into the transformed coordinate memory 7 to be processed by the image changing unit 8. FIG. 13 illustrates these data items.

In step ST15, the addition of k=k+1 is performed. In ST16, it is determined whether or not the next character is either the last character of the jth word of the ith line or the character following the last character of the jth word (i.e., K≦NCK). If K≦NCK, steps ST13 and ST14 are repeated for the character still next to that next character. If K>NCK, the addition of j=j+1 is carried out in ST17, and it is determined in ST18 whether or not the next word follows the last word of the ith line (i.e., j>NWj). If NO in ST18, steps ST11 to ST17 are repeated for the word still next to that next word. If YES in ST18, that is, j>NWj, whereby the last word of the ith line is processed, the addition of i=i+1 is performed (ST19).

Thereafter, the next line is processed. In step ST20, it is determined whether or not the last line has been processed (i.e., i>NL). If NO, ST9 to ST19 are repeated.

In the present embodiment, the spaces around the characters, namely, both the character space, in the horizontal direction and the space in the vertical direction or line space are adjusted as described above. Nonetheless, only the character space may be adjusted by setting the space SP defined by Equation (4) at min (X2), or only the line space may be adjusted by setting the space SP at the value of min (Y2).

B. Adjustment of Margins

Figure 14B:
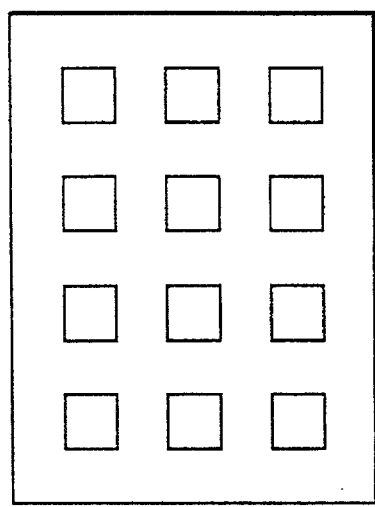
FIGS. 14A, 14B and 14C are diagrams explaining how space-adjusting is performed on the image data input to the apparatus.
Figure 14C:
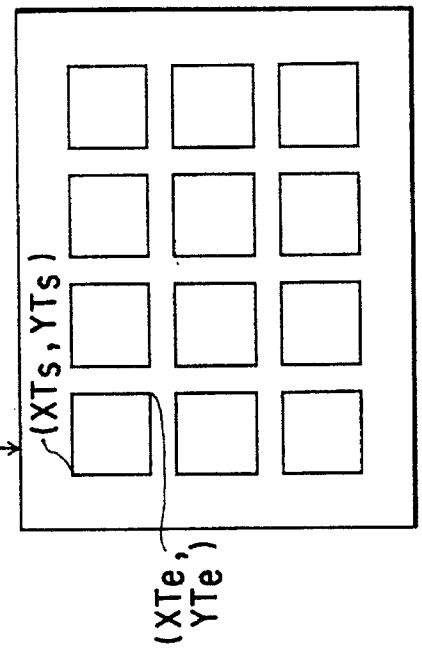
Figure 14A:
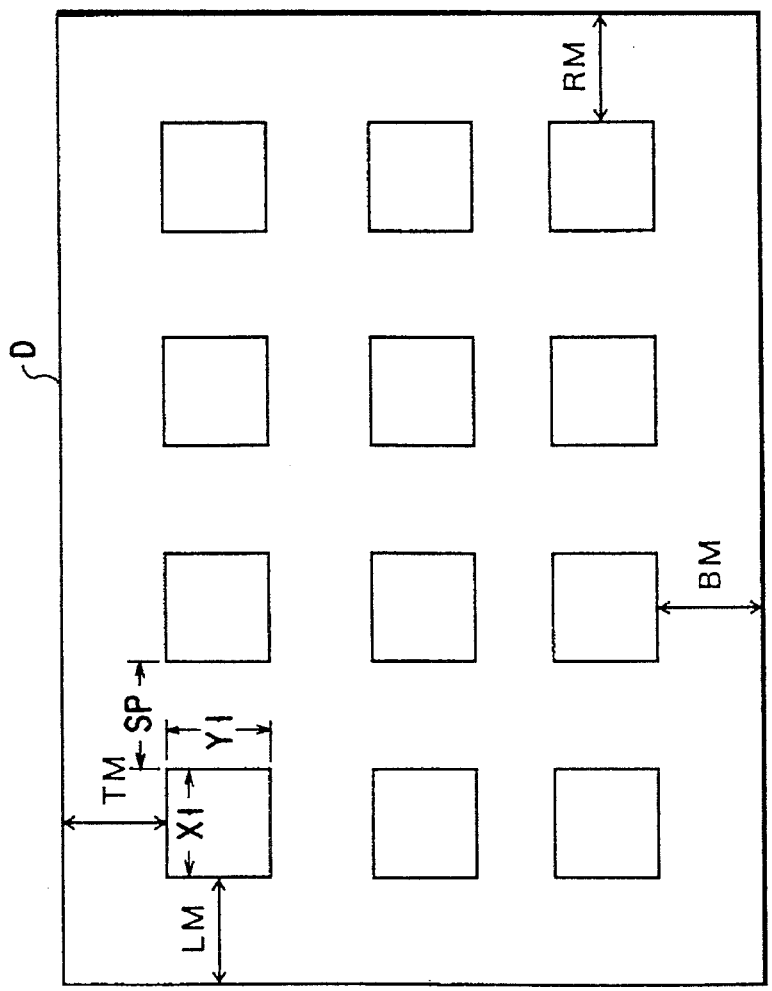

How to adjust the margins will be explained with reference to FIGS. 14A, 14B and 14C. The unit 5 reads minimum top margin TMM, minimum bottom margin BMM, minimum left margin LMM and minimum right margin RMM from the criteria memory 6, and also reads the top margin TM, bottom margin BM, left margin LM and right margin RM from the feature memory 4. From the margins read from the memories 4 and 6, the unit 5 calculates values TMA, BMA, LMA and RMA by which margins TM, BM, LM and RM can be adjusted.

$$\begin{aligned} TMA &= TM - TMM \\ BMA &= BM - BMM \\ LMA &= LM - LMM \\ RMA &= RM - RMM \end{aligned} \qquad (9)$$

From the values TMA, BMA, LMA and RMA, the unit 5 obtains the values SPA_X and SPA_Y by which the spaces in both X and Y directions around the character can be adjusted, as follows:

$$\begin{aligned} SPA\_X &= (LMA + RMA) * SR1/NC \\ SPA\_Y &= (TMA + BMA) * SR1/NL \end{aligned} \qquad (10)$$

NC is the number of characters forming one line, and NL is the number of lines printed on the document. Replacing the SPA_X or SPA_Y with X2' in Equation (7), the coordinate transformation unit 5 calculates SR2. The unit 5 can then obtain the coordinates each character assumes after the character space and the line space are changed, by generalizing Equation (8) as follows by applying SR2:

$$\begin{aligned} X1 &= X\_end - X\_start \\ XT\_start &= X\_start * SR1 - \alpha 1 \\ XT\_end &= XT\_start + X1 * SR2 \end{aligned} \qquad (11)$$

$$\begin{aligned} Y1 &= Y\_end - Y\_start \\ YT\_start &= Y\_start * SR1 - \beta 1 \\ YT\_end &= YT\_start + Y1 * SR2 \end{aligned} \qquad (12)$$

In these equation, $\alpha 1$ and $\beta 1$ are:
$$\alpha 1 = LMA - i * (SPA\_X)$$
$$\beta 1 = TMA - j * (SPA\_Y)$$

If $\alpha$ and $\beta$ are 0, Equation (11) will be identical to Equation (8).

C. Adjustment of Word Space

The coordinate transformation unit 5 calculates the value TKA by which the word space can be adjusted, in the same way as the value by which the character space can be adjusted. To be more specific, the unit 5 first reads the minimum word space TKM from the criteria memory 6, and the number of words NW, the word space TK, the number of characters NC, the character space, and the like from the feature memory 4. Then, the unit 5 calculates the value TKA from these data items, as follows:

$$TKA = (TK - TKM) * NW$$

From the value TKA, thus calculated, the unit 5 obtains the value SWA_X by which the character space can be adjusted, in the following way:

$$\begin{aligned} SWA\_X &= (TKA * SR1)/NC \\ WKA\_X &= \{(TK - TKM) * SR1\} + (SWA\_X * NCW) \end{aligned} \qquad (13)$$

where WKA_X is word space and NCW is the number of characters forming word j.

The coordinate transformation unit 5 calculates the image-reducing ratio SR2 as follows:

$$\begin{aligned} X1 * SR2 &= (X1 + SWA\_A) * SR1 \\ SR2 &= (1 + SWA\_X/X1) * SR1 \end{aligned} \qquad (14)$$

The coordinate transformation unit 5 also changes the coordinates as indicated below:

$$\begin{aligned} X1 &= X\_end - X\_start \\ XT\_start &= X\_start * SRT1 - \alpha 2 \\ XT\_end &= XT\_start + X1 * SR2 \end{aligned} \qquad (15)$$

Here, the offset $\alpha 2$ is given as:

$$\alpha 2 = \{(SWA\_X) * (i-j)\} + \{(WKA\_X) * (j-i)\} \qquad (16)$$

where i is the position the character to be processed (e.g., i=10, indicating the tenth character of the line is to be processed), and j is the position of the word including that character (e.g., j=2, indicating the second word of the line includes that character).

Furthermore, the coordinate transformation unit 5 can calculates character-block space (i.e., column spaces) and can adjust the line space for relatively large, thereby to change the image-reducing ratio for small characters only. Thus, different image-receding ratios can be applied to the same document data, for the purpose of adjusting various spaces.

The coordinate transformation unit 5 will be described in detail, with reference to FIG. 15 showing a block diagram.

As shown in FIG. 15, the coordinate transformation unit 5 comprises a controller 51, a feature reader 52, an image-reducing ratio calculator 53, a criteria accessing device 54, a transformed-coordinate accessing device 55, a character-space calculator 56, a word-space calculator 57, a left/right margin calculator 58, a horizontal space calculator 59, line-space calculator 60, a top/bottom margin calculator 61, a vertical space calculator 62, an image-reduction determining section 50, subtracters 63a to 63f, adders 64a to 64h, multipliers 65a to 65f, and dividers 66a and 66b.

The controller 51 is a CPU for controlling other components of the coordinate transformation unit 5. The controller 51 may be replaced by the CPU 13A which is incorporated in the control section 13 (FIG. 1).

The feature reader 52 is means for reading various data items from the feature memory 4. Among the data items are the position of each character, the size of the document D, and the average character space of each line. The criteria accessing device 54 is means for reading the criteria for selecting the output interfaces 12a to 12m (FIG. 1), which have been stored into the criteria memory 6 from external devices. The image-reducing ratio calculator 53 is means for receiving the document-size-data from the feature reader 52, reading the data representing the size of media used in any one of the output devices 16a to 16m selected in accordance with the criteria which the criteria accessing device 54 has read. Based on the media-size data the calculator 53 obtains the simple image-reducing ratio SR1.

The simple image-reducing ratio SR1 includes two image-reducing ratios SR1x and SR1y. The ratio SR1x is a ratio at which the image is to be reduced along the X axis and which has been obtained from the X-axis size of the document D and the X-axis size of the media. The ratio SR1y is a ratio at which the image is to be reduced along the Y axis and which has been obtained from the Y-axis size of the document D and the Y-axis size of the media. The ratios SR1x and SR1y are equal if the ratio between the X-axis and Y-axis sizes (i.e., width-to-length ratio) of the document D is identical to the ratio between the X-axis and Y-axis sizes (i.e., width-to-length ratio) of the media. Otherwise, the ratios SR1x and SR1y are different.

The image-reduction determining section 50 determines, from the minimum character size and the like, whether or not it is necessary to change the image-reducing ratios SR1_X and SR1_Y the image-reducing ratio calculator 53 has calculated. If the section 50 finds it necessary to change the ratios SR1_X and SR1_Y, it supplies a drive signal to the character-space calculator 56, the word-space calculator 57, the left/right margin calculator 58, the horizontal space calculator 59, line-space calculator 60, the top/bottom margin calculator 61, and the vertical space calculator 62. The character-space calculator 56 shown in FIG. 15 is designed to calculate a value X21 by which the inter-character space can be adjusted in the horizontal direction (i.e., along the X axis), in accordance with Equation (6). Similarly, the line-space calculator 60 is designed to calculate a value Y21 by which the inter-character space can be adjusted in the vertical direction (i.e., along the Y axis). The word-space calculator 57 is provided to calculate a value X22 by which the inter-word space can be adjusted in the horizontal direction (i.e., along the X axis), in accordance with Equation (13), and also a coordinate offset $\alpha$ of each character in accordance with Equation (16). The left/right margin calculator 58 is designed to calculate a value X23 by which the left or right margin can be adjusted, in accordance with Equation (10), and also a coordinate offset $\alpha 3$ of the margin in accordance with Equation (12). Similarly, the top/bottom margin calculator 61 is provided to calculate a value Y22 by which the top or bottom margin can be adjusted, and also a coordinate offset $\beta 2$ of the margin in accordance with Equation (12). The horizontal space calculator 59 and the vertical space calculator 62 are designed to calculate coordinate offsets for the large spaces such as inter-column spaces, in similar methods which are not described in detail in connection with the present embodiment. Driven by the drive signal, the calculators 56 to 62 calculate values X21 to X24 by which various spaces can be adjusted in the horizontal direction, values Y21 to Y23 by which the spaces can be adjusted in the vertical direction, X-axis coordinate offsets $\alpha 2$, $\alpha 3$ and $\alpha 4$, and Y-axis coordinate offsets $\beta 2$ and $\beta 3$.

The sum values XS (X21+X22+X23+X24) and the offset $\alpha$ ($\alpha 1+\alpha 2+\alpha 3$) are obtained. Namely, the offset $\alpha 2$, the value X24 and the offset $\alpha 4$ are added, providing a sum $\alpha$. The value Y22 and the offset $\beta 2$ are added together, forming a sum $\beta$. The values Y21 and Y23 and the offset $\beta 3$ are added, providing a sum Y2. The sums X2, $\alpha$, $\beta$ and Y2, thus obtained, are processed, image-reducing ratios SR2_X and SR2_Y. Further, changed coordinates (STX, YTS) and (XTE, YTE) and the changed character size ($\Delta$XT, $\Delta$YT) are calculated from the original coordinates (XS, YS) and (XE and YE). The transformed coordinates and the changed character size are supplied to the transformed coordinate memory 7 under the control of the CPU 51, and written at the addresses designated by the transformed-coordinate accessing device 55. The adding of data items and the processing of the resultant sums are effected by the subtracters 63A to 63f, the adders 64a to 64h, multipliers 65a to 65f, and the dividers 66a and 66b.

In the methods of adjusting the inter-character space, the inter-word space and the margins, explained with reference to Equations (7) to (16), the image-reducing ratio SR2 to be applied after the spaces are adjusted is first obtained, and the start-point and end-point coordinates, which will be applied after the spaces are adjusted, are then calculated from the start-point and end-point coordinates of the conected components. The start-point and end-point coordinates, thus calculated, are represented as follows by using the symbols shown in FIG. 15:

$$X1 = XE - XS \tag{17-1}$$

$$SR2\_X = ((X1+X2)/X1) * SR1\_X \tag{17-2}$$

$$XTS = XS * SR1\_X - \alpha \tag{17-3}$$

$$\Delta XT = X1 * SR2\_X \tag{17-4}$$

$$XTE = XTS + \Delta XT \tag{17-5}$$

$$Y1 = YE - YS \tag{18-1}$$

$$SR2\_Y = ((Y1+Y2)/Y1) * SR1\_Y \tag{18-2}$$

$$YTS = YS * SR1\_Y - \beta \tag{18-3}$$

$$\Delta YT = Y1 * SR2\_Y \tag{18-4}$$

$$YTE = YTS + \Delta YT \tag{18-5}$$

where XS is the X-axis ordinate of the start, point of the connected component, XE is the X-axis ordinate of the end point thereof, SR1_X is a simple reduction ratio at which images will be reduced in the horizontal direction, SR2_X is a ratio at which space-adjusted images will be reduced in the horizontal direction, STS is the X-axis ordinate of the start point of the adjusted image component, XTE is the X-axis ordinate of the end point thereof, and X2 is a value by which any space and margin can be adjusted.

In the case of the character-space calculator 56 shown in FIG. 15, X2 in Equation (17-2) is the value X21 by which the inter-character space is to be adjusted in the horizontal direction. Equation (17-2) is identical to Equations (7) and (8) since $\alpha=0$ in Equation (17-2). Thus, Equation (17-2) serves to adjust the inter-character space.

In the case of the word-space calculator 57 shown in FIG. 15, X2 in Equation (17-2) is the value X22 by which the inter-word space is to be adjusted in the horizontal direction. Equation (17-2) is identical to Equations (10) and (11). Thus, Equation (17-2) serves to adjust the inter-word space.

In the case of the left/right margin calculator 58 shown in FIG. 15, X2 in Equation (17-2) is the value X23 by which the left or right margin is to be adjusted. Since $\alpha$ in Equation (17-3) is $\alpha 3$, Equation (17-2) corresponds to Equations (14) and (15), both relating to the margin adjustment.

The methods of adjusting of spaces in the vertical direction and the adjusting of the top and bottom margins can be explained in a similar manner, by replacing X and $\alpha$ by Y and $\beta$, respectively.

In short, all various spaces (including the margins) may be adjusted in accordance with Equations (17-1) to (17-5) and (18-1) to (18-5) only and by using the image-reducing ratios SR2_X and SR2_Y, the values X2 and Y2 by which the spaces can be adjusted, the X-axis coordinate offset $\alpha$ and the Y-axis coordinate offset $\beta$, provided that the values by which the inter-character space is adjusted in the horizontal and vertical directions and the coordinate offsets $\alpha$ and $\beta$ for each character are calculated independently.

Alternatively, the various spaces (including the margins) may be adjusted at a time, by simultaneously performing the methods of adjusting them. More specifically, the sum of the values by which the spaces are to be adjusted in the horizontal direction and the sum of X-axis coordinate offsets are first calculated as follows:

$$\Sigma X2i = X21+X22+X23+\ldots \equiv X2 \qquad (19)$$

$$\Sigma \alpha = \alpha 1 + \alpha 2 + \alpha 3 + \ldots \equiv \alpha \qquad (20)$$

The value X2 by which any space is to be adjusted in the horizontal direction and the X-axis coordinate offset $\alpha$ for any space are substituted by the sum $\Sigma X2i$ and the sum $\Sigma \alpha i$, respectively, in Equations (17-1) to (17-5). Then, the sum of the values by which the spaces are to be adjusted in the vertical direction and the sum of Y-axis coordinate offsets are first calculated as follows:

$$\Sigma Y2i = Y21+Y22+Y23+\ldots \equiv Y2 \qquad (21)$$

$$\Sigma \beta i = \beta 1 + \beta 2 + \beta 3 + \ldots \equiv \beta \qquad (22)$$

The value Y2 by which any space is to be adjusted in the horizontal direction and the X-axis coordinate offset $\beta$ for any space are substituted by the sum $\Sigma Y2i$ and the sum $\Sigma \beta i$, respectively, in Equations (18-1) to (18-5). Thus, the various spaces (including the margins) in the vertical direction are be adjusted at the same time.

The adder 64a shown in FIG. 15 is provided to calculate the sum $\Sigma X2i$ defined by Equation (19), and the adder 64d shown in FIG. 15 to calculate the sum $\Sigma \alpha i$ defined by Equation (20). The adder 64f shown in FIG. 15 is designed to calculate the sum $\Sigma Y2i$ defined by Equation (21), and the adder 64e shown in FIG. 15 to calculate the sum $\Sigma \beta i$ defined by Equation (22).

In the coordinate transforming unit 5 (FIG. 15), the space calculators 56 to 62 may be controlled by a CPU, and the CPU can determine whether or not these calculators 56 to 62 are processing data. If any one of these calculators is controlled not processing data, its output (i.e., the offset $\alpha i$ associated with X2i or $\beta i$ associated with Y2i) is zero. In this case, the space cannot be adjusted at all. Thus, the unit 5 can adjust one space (e.g., the inter-word space), or it can adjust two or more other spaces (e.g., the intercharacter space, the line space and the margin) at the same time. Furthermore, the unit 5 can achieve the horizontal space-adjustment and the vertical space-adjustment independently.

In the coordinate transforming unit 5 (FIG. 15), the start-point and end-point coordinates of each character can be obtained by Equations (17-1) to (17-5) and Equations (18-1) to (18-5), once the values by which the adjustable various spaces (including the margins) have been calculated and the offsets for these spaces have been calculated.

The value X1 in Equation (17-1) is calculated by subtracting XS from XE by means of the subtracter 63a. The value SR2_X defined by Equation (17-2) is obtained by adding X1 and X2 in the adder 64c, by dividing the resultant sum by X1 in the divider 66a, and by multiplying the resultant quotient by SR1_X in the multiplier 65b. Then, the X-axis ordinate XTS of the start point for any adjusted space, which is defined by Equation (17-3) is calculated by multiplying SR1_X and XS in the multiplier 65a and by subtracting from the resultant product the offset output by the adder 64d in the subtracter 63b. The value $\Delta$XT defined by Equation (17-4) is obtained by multiplying X1 and SR2_X in the multiplier 65c. The X-axis ordinate XTE of the end point for any adjusted space, defined by Equation (17-5), is calculated by adding the output $\Delta$XT of the multiplier 65c and the output XTS of the subtracter 63b, by means of the adder 64b.

Similarly, the value Y1 defined by Equation (18-1) is calculated by subtracting YS from YE by means of the subtracter 63f. The value SR2_Y defined by Equation (18-2) is obtained by adding Y1 and Y2 in the adder 64g, by dividing the resultant sum by Y1 in the divider 66b, and by multiplying the resultant quotient by SR1_Y in the multiplier 65d. Then, the Y-axis ordinate YTS of the start point for any adjusted space, which is defined by Equation (18-3) is calculated by multiplying SR1_Y and YS in the multiplier 65f and by subtracting from the resultant product the offset output by the adder 64f in the subtracter 63e. The value $\Delta$YT defined by Equation (18-4) is obtained by multiplying Y1 and SR2_Y in the multiplier 65e. The X-axis ordinate YTE of the end point for any adjusted space, defined by Equation (18-5), is calculated by adding the output $\Delta$YT of the multiplier 65e and the output YTS of the subtracter 63e, by means of the adder 64h.

The image changing unit 8 (FIG. 1) reads the coordinate data from the feature memory 4. It also reads the corresponding image data from the input image memory 2. The unit 8 then changes the image data in accordance with the transformed coordinates which correspond to the image data. The image data, thus changed, is stored into the output-image memory 9 (see FIG. 1).

Figure 16:
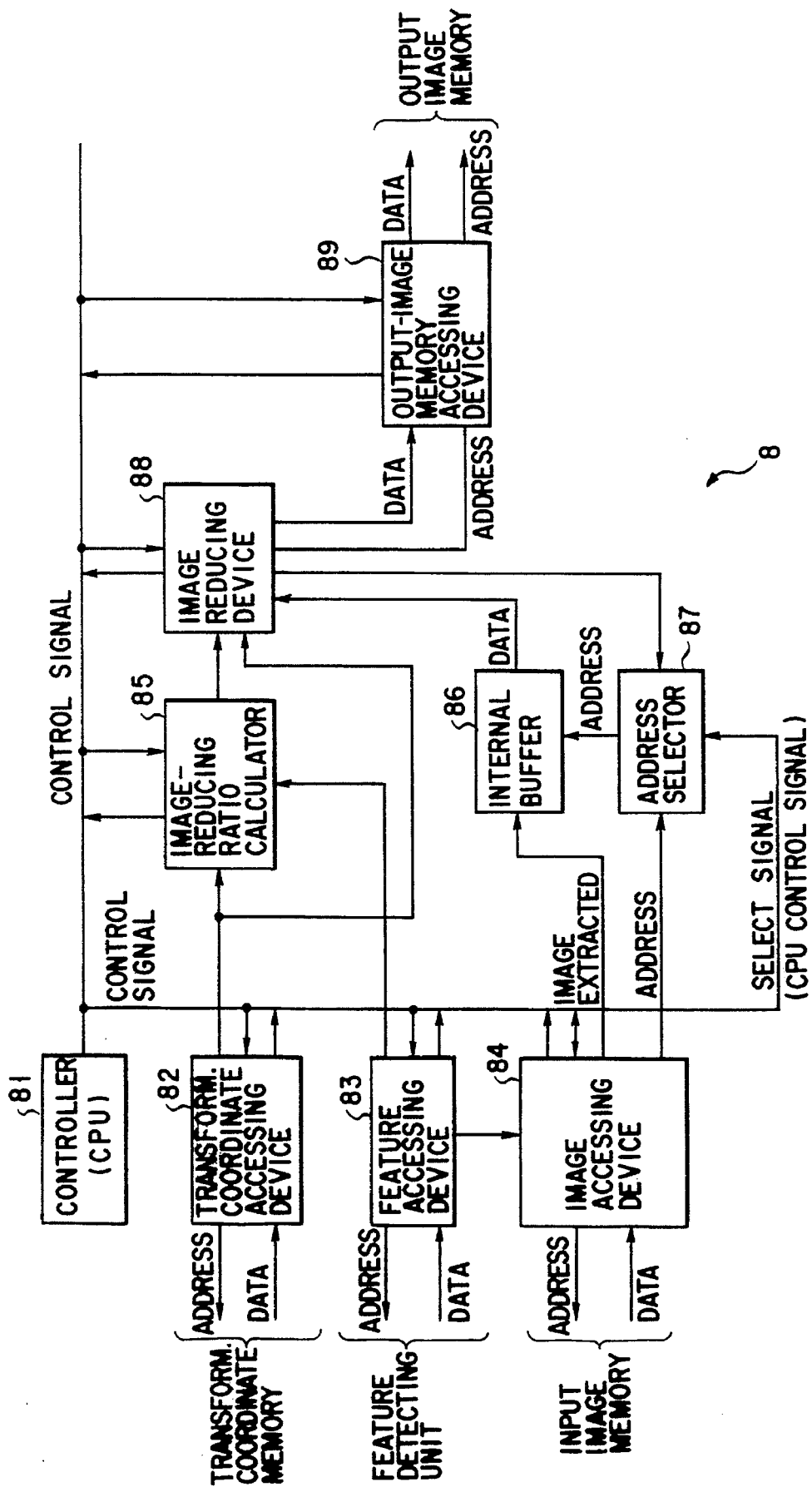
FIG. 16 is a block diagram illustrating the image changing unit of the apparatus shown in FIG. 1.

The image changing unit 8 will be described more detail, with reference to FIG. 16 which shows a block diagram. As FIG. 16 shows, the unit 8 comprises a controller 81, a transformed-coordinate accessing device 82, a feature accessing device 83, an image accessing device 84, an image-reducing ratio calculator 85, an internal buffer 86, an address selector 87, an image reducing device 88, and an output-image memory accessing device 89.

The controller 81 is a general-purpose CPU for controlling other components of the image changing unit 8. The controller 81 may be replaced by either the CPU 13A incorporated in the control section 13 or the CPU 51 provided in the coordinate transformation unit 5. The transformed-coordinate accessing device 82 generates an address and a control signal in accordance with instructions supplied from the CPU 51. Thus, data is exchanged between the memory 7 and the device 82. The address output from the device 82 designates, for example, the first character of the first word of the first line. As a result, the device 82 reads the transformed coordinates of that character from the transformed coordinate memory 7.

The feature accessing device 83 reads the coordinate data for the first character of the first word of the first line from the feature memory 4. The device 83 then reads the image data corresponding to the coordinate data, from the input image memory 2. The image data is stored into the internal buffer 86. The image-reducing ratio calculator 85 reads the coordinates of the first character from the feature accessing device 83. The calculator 85 also, reads the transformed coordinates of the first character from the transformed-coordinate accessing device 82. The calculator 85 then calculates an image-reduction ratio for the character. For example, it calculates the width-reducing ratio for the first character of the first word of the first line, as follows:

$$SR\_X = (\Delta x1)/(XS_{13}\_1\_1\_1 = XE\_1\_1\_1)$$

where $SR\_X$ is the width-reducing ratio, $\Delta X1$ is the reduced width of the character, and $XS\_1\_1\_1$ and $XE\_1\_1\_1$ are the start coordinates of the character.

The image reducing device 88 receives the image-reducing ratio from the image-reducing ratio calculator 85 and processes the image data stored in the internal buffer 86. The size of the character represented by the image data is thereby reduced in accordance with the image-reducing ratio.

The present embodiment employs the nearest neighbor method to reduce the size of a character. This method performs re-sampling to an extracted image of a character in accordance with the image-reducing ratio. The re-sampled position may happen among the four adjacent sampled positions. In this case, there is sampled the value of that one of the four pixels near the re-sampling position, which is the closest to the re-sampling position.

Figure 17:
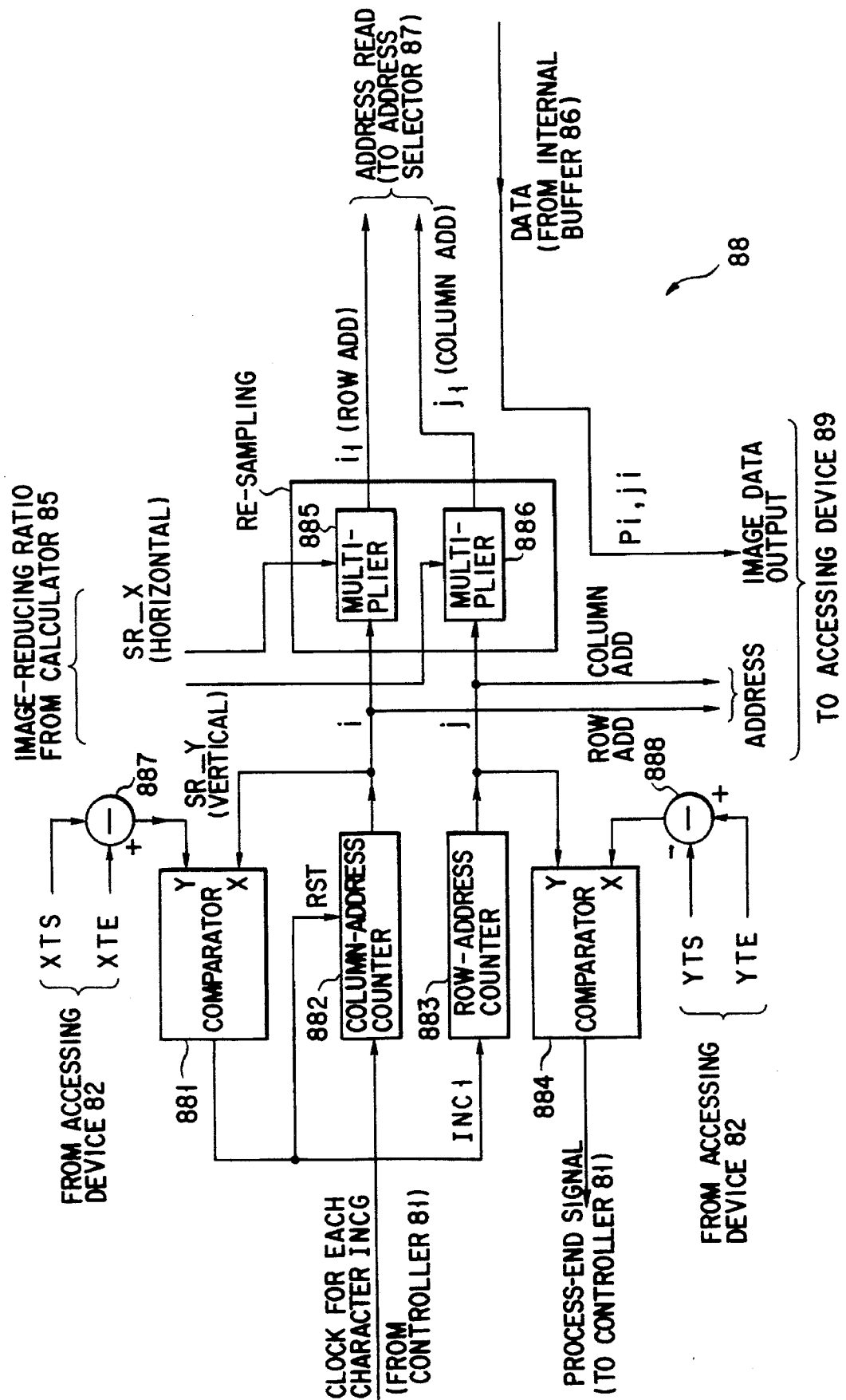
FIG. 17 is a block diagram illustrating the image reducing section of the apparatus shown in FIG. 1.

The image reducing device 88 will be described in detail, with reference to FIG. 17 which is a block diagram. As seen from FIG. 17, the device 88 comprises two comparators 881 and 884, a column-address counter 882, a row-address counter 883, two multipliers 885 and 886, and two subtracters 887 and 888.

The column-address counter 882 receives clock pulses INGC for pixels. Every time it receives a clock pulse INGC, Its count increases by one. The comparator 881 compares the count of the column-address counter 882 with the transformed X-axis coordinate (XTE–XTS) obtained by the subtracter 887. When the count of the counter 882 becomes equal to the transformed. X-axis coordinate, the comparator 881 outputs a reset signal RST to the column-address counter 882, resetting the counter 882. At the same time, the comparator 881 generates an address counter count-up signal INCL, which is supplied to the row-address counter 883 and increases the count of the counter 883 by one.

The count of the row-address counter 883, thus increased, is compared by the comparator 884 with the transformed Y-axis coordinate (YTE–YTS) obtained by the subtracter 888. When the count of the row-address counter 883 becomes equals to the transformed Y-axis coordinate, the comparator 884 outputs a process-end signal indicating that the character data has been processed to represent a character reduced in size. The process-end signal is supplied to the controller 81 (i.e. the CPU).

The multiplier 885 multiplies the count i of the column-address counter 882 by the width-reducing ratio $SR\_X$. The multiplier 886 multiplies the count j of the row-address counter 883 by the height-reducing ratio $SR\_Y$. Both multipliers 885 and 886 can round off the product, rendering the re-sampling position as close as possible to the sampling site. Thus, the extracted character image is re-sampled. The products il and jl of the multipliers 885 and 886 are supplied to the address selector 87 as a column address and a row address. These addresses il and jl are hence supplied to the internal buffer 86, whereby the re-sampled value Piljl is read from the buffer 86. Meanwhile, the value XTS is added to the output i of the column-address counter 882, providing a column address XTS+i for the output-image memory 9, and the value YTS is added to the output j of the row-address counter 883, providing a row address YTS+j for the output-image memory 9. These addresses XTS+i and YTS+j are supplied to the output-image memory accessing device 89 and hence to the output-image memory 9. The addresses XTS+i and YTS+j designate that address of the memory 9 at which the re-sampled value Pij is to be stored.

Figure 18:
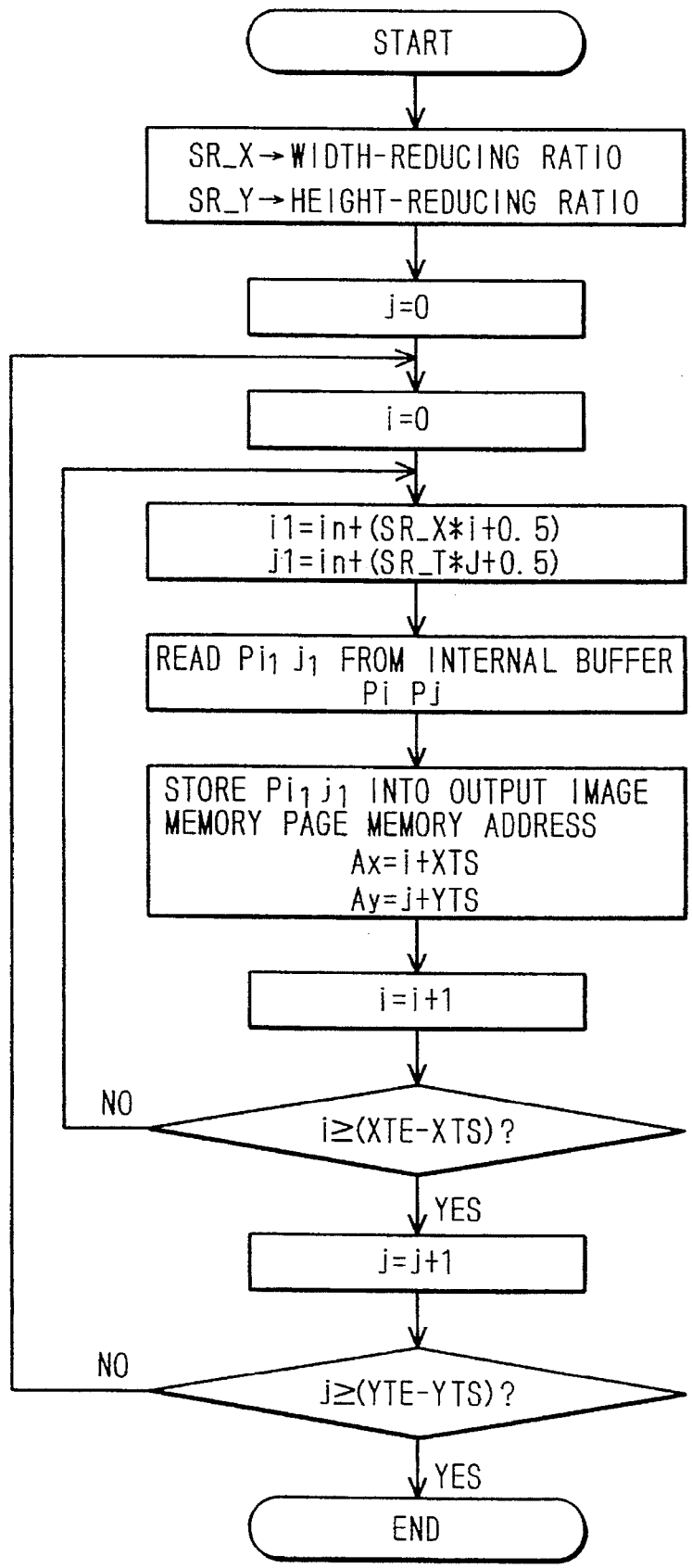
FIG. 18 is a flow chart explaining the re-sampling performed in the apparatus of FIG. 1.

FIG. 18 is a flow chart explaining the re-sampling performed in the image reducing device 88. As can be understood from FIG. 18, the image changing unit 8 performs the above-described image-reducing process on the image data representing each character printed on the document D, generating image data representing the character reduced in size. The image data is stored into the the output-image memory 9. The output section 10 (FIG. 1) selects one of the output interfaces 12a to 12m, reads the image data from the memory 9, and supplies it to the corresponding output device selected.

The present embodiment has general-purpose CPUs which execute programs to process the document-image data. These CPUs may be replaced by hardware designed to process the document-image data, thereby to attain the same advantages as achieved by the use of general-purpose CPUs. Furthermore, the physical features of the document, such as left, right, top and bottom margins, column spaces, character spaces, inter-word spaces, line spaces, and the like, can be calculated from length data items (e.g., in millimeters).

It will now be explained how the image-data processing apparatus operates to output a composite image shown in FIG. 19, onto a medium whose length and width are 50% of those of the document D and whose area is 25% thereof. FIG. 20A shows a document image obtained by performing simple image-reducing process on the the entirety image of the document D. FIG. 20B illustrates a document image obtained by effecting space-adjusting process on the reduced document image of FIG. 20A.

Figure 19:
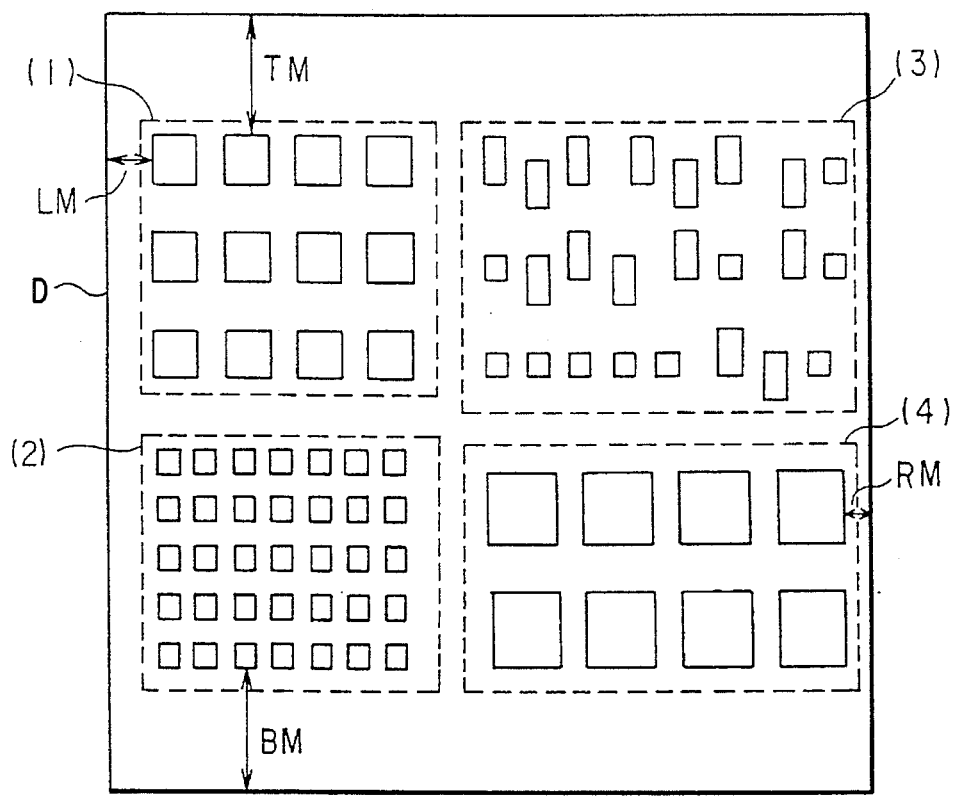
FIG. 19 shows a composite image composed of a plurality of documents not edited yet.
Figure 20A:
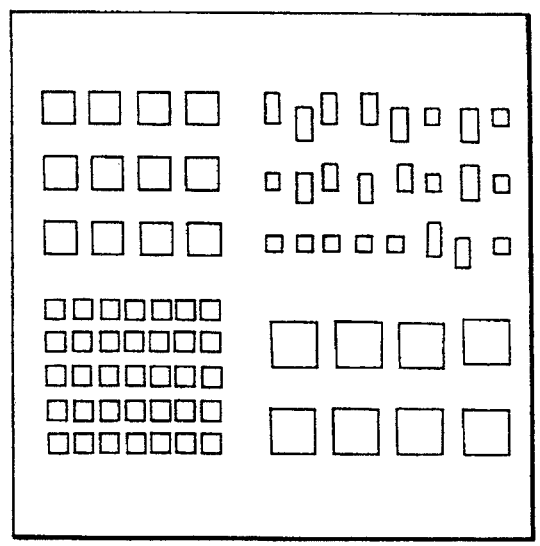
FIGS. 20A and 20B show two images which have been edited by different methods.
Figure 20B:
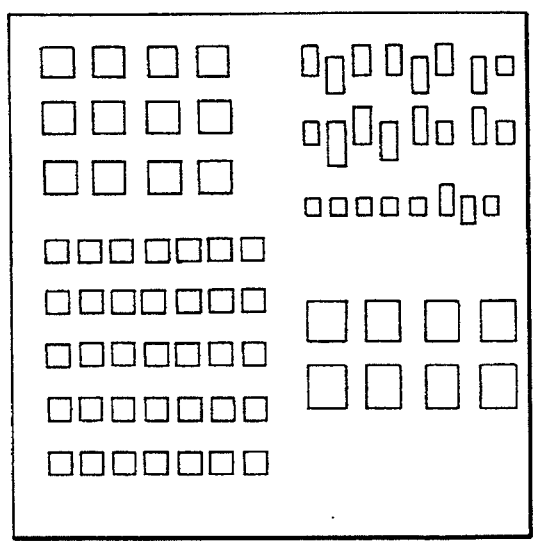

As shown in FIG. 19, the document D has four printed columns (1) to (4), and the characters in each column have a size different those in any other printed column. Assume that the characters printed in the column (2) are so small that they will be illegible if reduced to 25% of their size, that the characters printed in the other columns (1), (3) and (4) are relatively large, and that the data in the columns (1) and (4) is written in Japanese and the data in the column (3) is written in English.

The top and bottom margins on the reduced document image of FIG. 20B are less than those of the reduced document image of FIG. 20A by 60% and 28%, respectively. The column (1) of the reduced document image of FIG. 20B is 50% of the column (1) of the document D. The character space and line space in the column (1) of the reduced document image of FIG. 20B are 20% less than those in the column (1) of the reduced document image of FIG. 20A. In the column (2) of the document image shown in FIG. 20B, the characters have a width and a height which are 80% of those of the characters printed in the column (2) of the document D, and the character space is about 33% less than the character space in the column (1) of the document D. Therefore, the characters printed in the column (2) of the image shown in FIG. 20B can be recognized.

Even if the space between the columns (1) and (3) and the space between the columns (2) and (4) are 20% less than the corresponding column spaces in the reduced document image of FIG. 20A, it is necessary to decrease the widths of the columns (3) and (4) by about 28%. This is because an image-reducing ration of 80% has been applied to the column (2) of the document D. To decrease the columns (3) and (4) in width by about 28%, an image-reducing ratio of 50% is applied to the column (3), the character space and the word space in the column (3) are 50% of those for the column (3) on the reduced document image of FIG. 20A. For the same purpose, an image-reducing ratio of 40% is applied to the column (4), the character space in the column (4) is increased by 20%.

As indicated above, the image-data processing apparatus can change the character space, the line space, the image-enlarging ratio and the image-reducing ratio for any column on of the document D, in accordance with the size of the characters printed in that column, and can therefore output the document data onto a medium of any desired size so that the data may be legible.

The columns (1), (2), (3) and (4) on the document D can be regarded as independent documents. The image-data processing apparatus can combine the columns (1) to (4) and output image data representing one document which is easy to read. More precisely, the apparatus can detects the size of the characters printed in each column, the spaces among the columns (1) to (4) and the like and can change and adjust these document features, thereby to generate image data representing an legible document.

How the apparatus reduces the image of any column as a whole has been explained above. Nevertheless, the image-data processing apparatus can output data representing an image of that column, a part of which is enlarged.

As described above, the image-data processing apparatus receives document image data and detects the physical features of the document (i.e., top, bottom, left and right margins, character space, line space, word space, column space, character size, coordinates of each character, and the like) from the data. The apparatus then calculates values by which to adjust the spaces, image-reducing/enlarging ratios and the like from the physical features and preset criteria for selecting any one of the output interfaces. Using these values calculated, the apparatus transforms the coordinates of each character. Then, the apparatus changes the input image data based on the original coordinates and transformed coordinates of each character. Finally, the image-data processing apparatus supplies image data thus changed to any output device already selected.

Moreover, the image-data processing apparatus can selects any one of the output devices in accordance with an output-device select signal supplied from any one of the input devices. Also can it selects the image data stored in any one of the output devices or a server in accordance with a select signal supplied from any one of the output devices (including the one to be selected). In addition, the apparatus can process image data supplied from any input device, such that the data may be output on a medium used in any output device. Conversely, the apparatus can process image data supplied from any output device or a server, such that the data may be used in any input device.

Furthermore, the control section can transfer image data from any input device or a memory located on the input side to any output device or a memory provided on the output side.

The present invention is not limited to the above-described embodiment to which a plurality of input devices and a plurality of output devices are connected. Rather, various changes and modification can be made without departing the scope of the present invention.

For instance, the image processing section 14 may be combined with the scanner 15b and an input interface 18 as is illustrated in FIG. 2B, constituting a consolidated scanner 15b' which functions as an input device for inputting image data. The image data generated by the scanner 15b is input to the image processing section 14. Connected to the input terminal 18 are input devices (not shown). The output data of the input interface 18 can be supplied to the image processing section 14. The image data output from the scanner 15b' and processed by the image processing section 14 is ultimately supplied to the printer 16b. In the consolidated scanner 15b' shown in FIG. 2B, the image processing section 14 selects process parameters in accordance with the data generated by the input devices (e.g., a keyboard and a touch panel). Using the parameters, the section 14 processes the image data supplied from the scanner 15b, generating image data which can be output on a medium by means of the printer 16b. The scanner 15b may be replaced by any other input device shown in FIG. 1.

Further, the image processing section 14 may be combined with, for example, the PDA 16c as is illustrated in FIG. 2C, constituting a consolidated PDA 16c'. In this case, the section 14 processes the image data the PDA 16c has accessed, thereby adjusting spaces. The image data processed is supplied to the PDA 16c, which displays the image represented by the input data. Similarly, the image processing section 14 may be combined with any other of the output devices 16a to 16m, constituting a consolidated output device.

Still further, the image-data processing apparatus may be modified to effect structural analysis on the image data read by the scanner 15b, to thereby detect only data items which represent meaningful terms such as sentences and photos, to calculate the sizes and positions which the meaningful items assume in the document D, and to extract the data items representing the meaningful items from the image data. By virtue of this image-extracting process, the apparatus outputs image data containing no data items representing stains, spots, blots and the like, if any, on the document.

Moreover, the apparatus may be modified to effect structural analysis on the image data which represents a composite document formed of several independent documents. One or more of the independent documents may be printed in small characters which may become illegible when reduced in size. To avoid this, structure analysis is applied to decrease the character space, thereby to minimize the image-reducing ratio for the characters. In other words, various spaces on the composite document are adjusted in accordance with the size of the medium on which the image data will be output, thereby to render the characters large enough to be legible. Subjected to structure analysis, the image data read by the scanner 15b can be more easily processed by the image processing section 14.

As has been described above, the present invention can provide an image-data processing apparatus which can process the image data read from a document, such that the characters on the document may be output in an optimum size on media different in size from the document.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image-data processing apparatus comprising:

input means for inputting first document image data including area data representing an area included in a document of a first size, the area having characters and spaces located around the characters;

means for converting the first document image data including area data input by said input means into a second document image data of a second size with a first conversion ratio; and size changing means for changing a relative size of the characters included in said area of the second size with respect to the spaces around the characters so that a space occupation ratio of the characters with respect to the space is increased in said area.

2. An image-data processing apparatus comprising:

input means for inputting image data representing an image including characters having a space around the characters;

feature detecting means for detecting features of the image from the image data, said features including the space, character coordinates of the characters and character size of said characters;

criteria memory storing predetermined criteria;

coordinate calculating means for calculating a space changing ratio based on the features detected by said feature detecting means and the criteria stored in said criteria memory to obtain transformed coordinates for each of characters contained in the image; and image data conversion means for converting the space changing ratio in accordance with the transformed coordinates for each character calculated by said coordinate calculating means, the image data input by said input means and the features detected by said feature detecting means.

3. An image-data processing apparatus according to claim 2, wherein said space around the characters includes a character space provided around each character and a line space provided upper and lower portions of a line of characters; and said image data conversion means includes means for converting a character space changing ratio and a line space changing ratio.

4. An image-data processing apparatus according to claim 2, wherein said criteria memory includes means for storing a predetermined minimum character size; and said coordinate calculating means includes means for obtaining the changing ratio for said at least one of the top, bottom, left and right margins, from the features detected by said feature detecting means and the predetermined minimum character size.

5. An image-data processing apparatus according to claim 2, wherein said feature detecting means includes means for detecting a column space of a document.

6. An image-data processing apparatus according to claim 2, wherein said feature detecting means includes means for determining whether the image data is written in Japanese or English and means for detecting word space, character coordinates and character size.

7. An image-data processing apparatus according to claim 2, wherein said feature detecting means includes means for detecting a character space, a line space, a column space, at least one of top, bottom, left and right margins, character coordinates and character size;

said memory means storing a predetermined minimum character size; and said coordinate calculating means includes means for obtaining at least one changing ratio for the character space, line space, top, bottom, left and right margins, column space, word space and the minimum character size stored in the memory means.

8. An image-data processing apparatus according to claim 2, wherein said coordinate calculating means includes means for calculating a first changing ratio of a size in a vertical direction of a character and a second changing ratio of a size in a horizontal direction of the character, the first and second changing ration being different with each other.

9. An image processing apparatus for outputting an image having a size reduced compared to an original size, comprising:

memory means for storing image data of an image including a plurality of characters and character spaces provided around the characters;

means for detecting feature data including positions of the characters, sizes of the characters and spaces of the characters from the image data stored in said memory means;

first calculating means for calculating a first reduction ratio (SR1) based on a size of the image data stored in said memory means and a size of an image reduced according to the first reduction ratio;

means for determining whether adjustment of the spaces of the characters based on the first reduction ratio calculated by said first calculating means is necessary; and image reduction means for reducing, when it is determined by said determining means that no space adjustment of the characters is necessary, the entirety of the image stored in said memory means with the first reduction ratio based on the position of the characters and the sizes of the characters, and for reducing, when it is determined by said determining means that space adjustment of the characters is necessary, the characters included in the image stored in said memory means with a second reduction ratio smaller than the first reduction ratio (SR2:SR2>SR1) so that the spaces of the characters become more smaller than a case wherein the characters are reduced with the first reduction ratio and that the entirety of the image stored in said memory means has the same size as in a case wherein the entirety of the image is reduced with the first reduction ratio.

10. An apparatus according to claim 9, wherein said determining means includes:

a second means for storing a minimum size of the characters;

a second calculating means for calculating a size of a reduced character reduced by the first reduction ratio calculated by said first calculating means based on the size of the characters detected by said feature detecting means; and comparison means for comparing the size, of the reduced character and the minimum size of the characters to determine, when a result of the comparing represents that the size of the reduced character is larger than the minimum size, that it is not necessary to adjust the spaces of the characters, and to determine, when the result of the comparing represents that the size of the reduced character is smaller than the minimum size, that it is necessary to adjust the spaces of the characters.

11. An apparatus according to claim 10, further comprising:
- a second memory means for storing a minimum size of the spaces of the characters; and
- a third calculating means for calculating an adjustable value of the spaces of the characters based on space data of the characters detected by said feature detecting means and said first reduction ratio;
- wherein said image reduction means reduces the reduction rate of the characters by the adjustable value of the spaces calculated by said third calculating means.

12. An apparatus according to claim 9, wherein said feature detecting means further includes means for detecting a margin space around the image stored in the memory means.

13. An apparatus according to claim 12, further comprising:
- a second memory means for storing a minimum size of margin spaces around the image; and
- a third calculating means for calculating an adjustable value of the margin space based on the margin space around the image detected by said feature detecting means and the minimum size of the margin space stored in said second memory means;
- wherein said image reducing means reduces the reduction rate of the characters by the adjustable value calculated by said third calculating means.

14. An apparatus according to claim 9, wherein said image reducing means comprises:
- means for calculating changed position data of the character reduced with the first reduction ratio based on the position data of the character detected by said feature detecting means; and
- image conversion means for reducing the character with one of the first and second reduction ratios based on a determination result of the determining means to position a reduced character at a position obtained by said changed position calculating means.

15. An apparatus according to claim 9, further comprising:
- means for outputting visibly the image reduced by said image reducing means; and
- means for setting size data representing a size of a reduced image capable of displaying visibly by said outputting means.

16. An apparatus according to claim 9, wherein said image processing apparatus is provided between an image input means and an image output means for visibly outputting the image with a predetermined size; and said image processing apparatus further comprises:
- means for receiving the image input by said image input means; and
- means for transmitting the image data reduced by said image reducing means to said image output means.

17. An apparatus according to claim 16, further comprising means for obtaining size data of the image output by said image output means as reduced image size data.

18. An image processing apparatus for outputting an image having a size reduced compared to an original size, comprising:
- a first memory means for storing image data of an image including a plurality of characters, character spaces provided around the characters and margin spaces around the image;
- means for detecting feature data including positions of the characters, sizes of the characters, spaces of the characters and the margins around the image from the image data stored in said first memory means;
- a second memory means for storing a minimum size of the characters, minimum size of the spaces of the characters, and minimum size of the margin spaces around the image;
- a first calculating means for calculating a first reduction ratio (SR1) based on a size of the image data stored in said memory means and a size of an image reduced according to the first reduction ratio;
- a second calculating means for calculating a size of a character reduced with the first reduction ratio calculated by said first calculating means based on the size of the character detected by said feature detecting means;
- means for determining, upon comparison of the size of the reduced character with the minimum size, that no space adjustment between characters is necessary when the size of the reduced characters is larger than the minimum size, and that the space adjustment is necessary when the size of the reduced characters is smaller than the minimum size;
- a first image reduction means for reducing, when it is determined by said determining means that no space adjustment of the characters is necessary, the entirety of the image stored in said memory means with the first reduction ratio based on the position of the characters and the sizes of the characters;
- a third calculating means for calculating adjustable values of the spaces of the characters and the margin spaces based on the spaces of the characters, margin spaces around the image, the minimum space of characters and the minimum value of the margin space around the image, when it is determined by said determining means that space adjustment of the characters is necessary;
- a fourth calculating means for calculating a second reduction ratio smaller than the first reduction ratio (SR2:SR2>SR1) as a character reduction ratio based on the adjustable value calculated by said third calculating means; and
- image reduction means for reducing, when it is determined by said determining means that the adjustment of spaces of the characters is necessary, so that the spaces of the characters and the margin spaces are smaller than a case wherein the spaces and the margin are reduced with the first reduction ratio but larger than the minimum size to make the entirety of the image stored in said memory means have a size reduced by the first reduction ratio.

* * * * *